US010756546B2

(12) United States Patent
Pmsvvsv et al.

(10) Patent No.: US 10,756,546 B2
(45) Date of Patent: Aug. 25, 2020

(54) METHODS OF ADVANCED GRID AND MICROGRID SUPPORT FUNCTIONALITIES THROUGH HYBRID FUEL CELL SYSTEMS

(71) Applicant: BLOOM ENERGY CORPORATION, Sunnyvale, CA (US)

(72) Inventors: Prasad Pmsvvsv, Sunnyvale, CA (US); Ranganathan Gurunathan, Bangalore (IN); Swaminathan Venkataraman, Cupertino, CA (US); Arne Ballantine, Palo Alto, CA (US); Deepak Balakrishnan, Bangalore (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 194 days.

(21) Appl. No.: 16/059,807

(22) Filed: Aug. 9, 2018

(65) Prior Publication Data

US 2019/0052094 A1  Feb. 14, 2019

Related U.S. Application Data

(60) Provisional application No. 62/543,668, filed on Aug. 10, 2017.

(51) Int. Cl.
*H02J 3/46* (2006.01)
*H02J 3/38* (2006.01)
*H02J 9/06* (2006.01)
*H02J 7/34* (2006.01)
*H02J 3/32* (2006.01)

(52) U.S. Cl.
CPC ........ *H02J 3/46* (2013.01); *H02J 3/32* (2013.01); *H02J 3/382* (2013.01); *H02J 7/34* (2013.01); *H02J 9/062* (2013.01); *H02J 3/383* (2013.01); *H02J 3/386* (2013.01); *H02J 3/387* (2013.01)

(58) Field of Classification Search
CPC ...... H02J 3/46; H02J 3/32; H02J 3/382; H02J 7/34; H02J 9/062; H02J 3/383; H02J 3/386; H02J 3/387
See application file for complete search history.

(56) References Cited

U.S. PATENT DOCUMENTS

| 7,713,649 | B2 | 5/2010 | Hickey et al. |
| 8,970,176 | B2 | 3/2015 | Ballantine et al. |
| 9,106,098 | B2 | 8/2015 | Srinivasan et al. |
| 9,362,815 | B2 | 6/2016 | Gurunathan et al. |
| 9,461,320 | B2 | 10/2016 | Ballantine et al. |
| 9,639,130 | B2 | 5/2017 | Gurunathan et al. |
| 9,972,852 | B2 | 5/2018 | Ballantine et al. |

(Continued)

OTHER PUBLICATIONS

U.S. Appl. No. 15/455,307, filed Mar. 10, 2017, Bloom Energy Corporation.

(Continued)

*Primary Examiner* — Robert L Deberadinis
(74) *Attorney, Agent, or Firm* — The Marbury Law Group, PLLC

(57) ABSTRACT

A method of controlling an inverter having a three phase output and a plurality of single phase loads connected to respective one of the three phases of the three phase output includes determining if a first phase of the three phase output has a heavier load than a second phase of the three phase output, and providing a higher output power from the inverter to the first phase than to the second phase if it is determined that the first phase has a heavier load than the second phase.

20 Claims, 24 Drawing Sheets

(56) References Cited

U.S. PATENT DOCUMENTS

| | | |
|---|---|---|
| 2006/0204827 A1 | 9/2006 | Hickey et al. |
| 2012/0098336 A1 | 4/2012 | Gurunathan et al. |
| 2012/0146587 A1 | 6/2012 | Srinivasan et al. |
| 2013/0253716 A1 | 9/2013 | Gross et al. |
| 2014/0009003 A1 | 1/2014 | Ballantine et al. |
| 2015/0228990 A1 | 8/2015 | Ballantine et al. |
| 2015/0288220 A1 | 10/2015 | Gurunathan et al. |
| 2017/0005480 A1 | 1/2017 | Ballantine et al. |
| 2017/0338502 A1 | 11/2017 | Pmsvvsv et al. |

OTHER PUBLICATIONS

U.S. Appl. No. 15/945,159, filed Apr. 4, 2018, Bloom Energy Corporation.

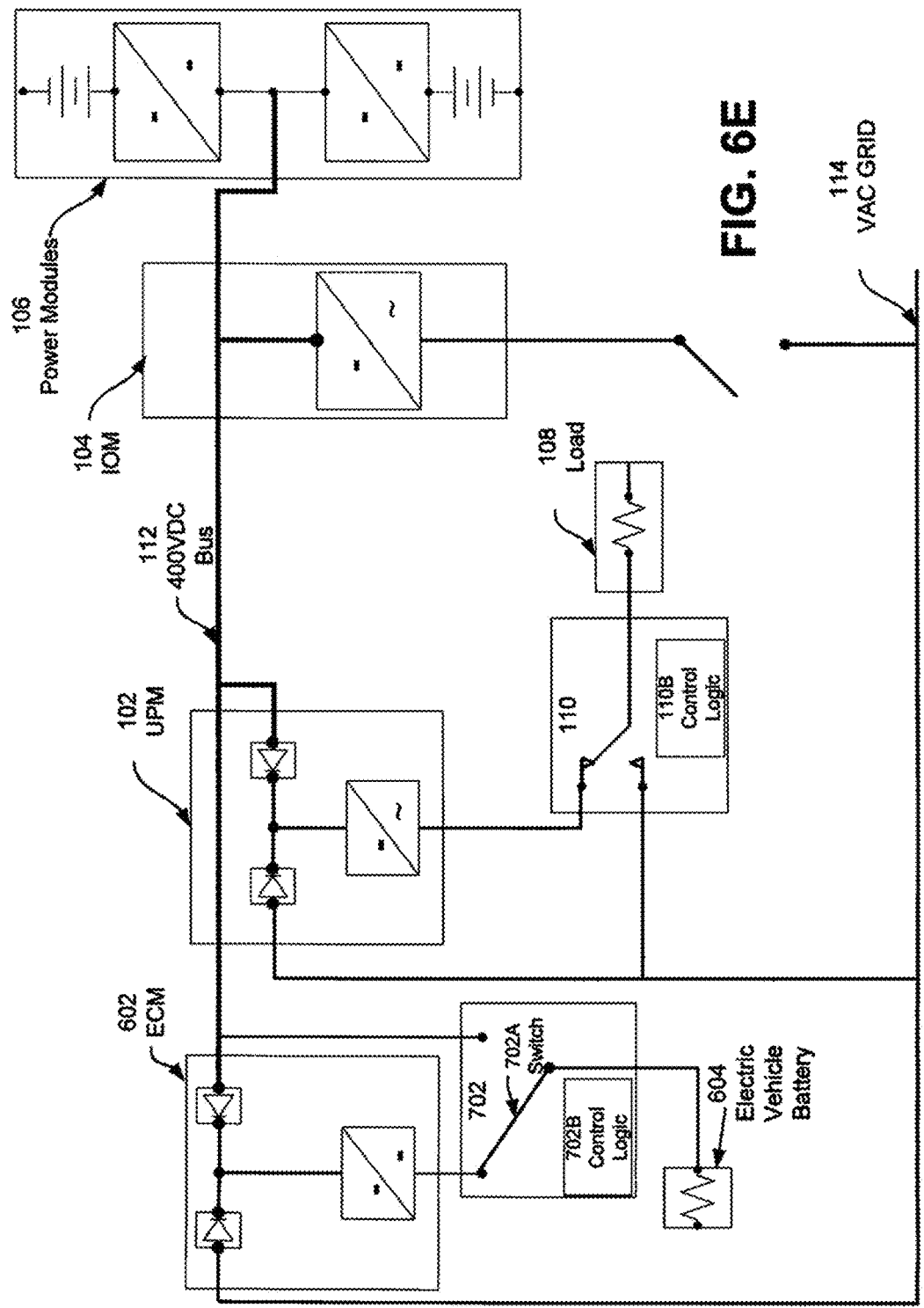

US 10,756,546 B2

METHODS OF ADVANCED GRID AND MICROGRID SUPPORT FUNCTIONALITIES THROUGH HYBRID FUEL CELL SYSTEMS

This application is a non-provisional application which claims benefit of priority of U.S. Provisional Application No. 62/543,668 entitled "Methods of Advanced Grid and Microgrid Support Functionalities through Hybrid Fuel Cell Systems" filed on Aug. 10, 2017, of which the entire contents are hereby incorporated by reference for all purposes.

BACKGROUND

An electric utility can distribute alternating current (AC) three-phase electrical power to an electrical load using an electrical grid infrastructure. A microgrid including distributed energy resources (DERs) can also be integrated into the electrical grid infrastructure network to provide behind the meter power generation and/or storage capabilities for an area electric power system (EPS) (e.g., a microgrid).

SUMMARY

An aspect of the present disclosure provides a method of controlling an inverter having a three phase output and a plurality of single phase loads connected to respective one of the three phases of the three phase output includes determining if a first phase of the three phase output has a heavier load than a second phase of the three phase output, and providing a higher output power from the inverter to the first phase than to the second phase if it is determined that the first phase has a heavier load than the second phase.

Another aspect of the present disclosure provides an electric power system, comprising direct current (DC) distributed power source, a DC to alternating current (AC) inverter, an AC microgrid comprising a plurality of single phase loads, first, second and third DC lines electrically connecting an output the DC distributed power source to an input of the inverter, first, second and third AC lines connecting an output of the inverter to an input of the microgrid, wherein each of the plurality of single phase loads is connected to a respective one of the first, second and third AC lines, and a processor. The processor is configured with processor-executable instructions to perform operations comprising determining whether to provide more output power from the inverter to a first AC line than to a second or third AC line based on one or more monitored power quality variables detected on the first, second and third AC lines, and providing a higher output power to the first AC line than to the second or third AC line in response to the step of determining.

DESCRIPTION OF THE DRAWINGS

The accompanying drawings, which are incorporated herein and constitute a part of this specification, illustrate exemplary embodiments. Together with the general description given above and the detailed description below, serve to explain the features of the various embodiments.

FIGS. 6A-6E illustrate various modes of operation of the system of the type shown in FIG. 1A to provide power to an electric vehicle (EV) charging station according to embodiments.

DETAILED DESCRIPTION

Figure 1A:
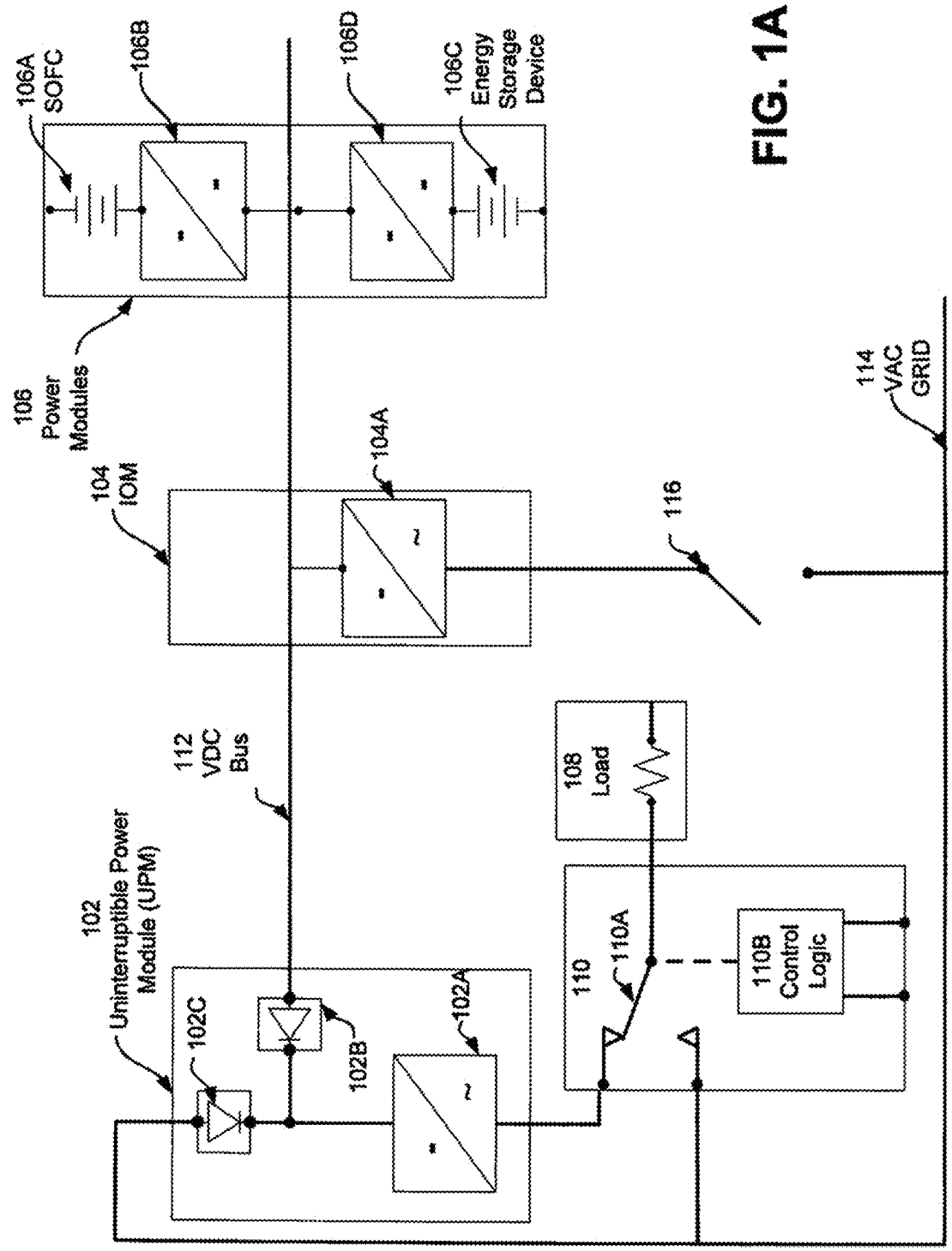
FIG. 1A is a block diagram illustrating a system according to an embodiment.

The various embodiments will be described in detail with reference to the accompanying drawings. Whenever possible, the same reference numbers will be used throughout the drawings to refer to the same or like parts. References made to particular examples, details, and representative materials, methods, and implementations are for illustrative purposes, and are not intended to limit the scope of the various embodiments of the claims.

The following description with reference to the accompanying figures is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "can have," "include", "may include", "can include", "comprise", and the like used herein indicate the existence of a corresponding feature (e.g., a number, a function, an operation, or an element) and do not exclude the existence of an additional feature.

The terms "A or B", "at least one of A or B", or "one or more of A or B" may include all possible combinations of items listed together. For example, the terms "A or B", "at least one of A or B", or "one or more of A or B" may indicate all the cases of (1) including at least one A, (2) including at least one B, and (3) including at least one A and at least one B.

The terms "first", "second", and the like used herein may modify various elements regardless of the order and/or priority thereof, and are used only for distinguishing one element from another element, without limiting the elements. For example, "a first element" and "a second element" may indicate different elements regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" as used herein may be interchangeably used with the terms, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation or a general-purpose processor (e.g., a central processing unit (CPU) or an application processor) for executing at least one software program stored in a memory device to perform a corresponding operation.

The terminology herein is only used for describing specific embodiments and is not intended to limit the scope of other embodiments. The terms of a singular form may include plural forms unless otherwise specified. The terms used herein, including technical or scientific terms, have the same meanings as understood by those of ordinary skill in the art. Terms defined in general dictionaries, among the terms used herein, may be interpreted as having meanings that are the same as, or similar to, contextual meanings defined in the related art, and should not be interpreted in an idealized or overly formal sense unless otherwise defined explicitly. Depending on the case, even the terms defined herein should not be such interpreted as to exclude various embodiments of the present disclosure.

The word "exemplary" is used herein to mean "serving as an example, instance, or illustration." Any implementation described herein as "exemplary" is not necessarily to be construed as preferred or advantageous over other implementations.

Although the electric utility can calibrate power distribution over the three phases to anticipate balance loading, various factors within the area EPS (i.e., behind the meter) can influence the quality and stability of the power within the electrical grid infrastructure. For instance, both single phase electrical loads and three-phase electrical loads can be distributed throughout the network. However, if the electrical loads are not distributed such that the loads draw power from all three phases proportionally, the quality of the power can be reduced due to phase imbalance. In addition, different electrical loads coupled to the network can result in different power factors across the three phases due to different reactive power (VARs) requirements. Also, certain types of electrical loads can distort the power signal and create undesirable harmonics within the network. Moreover, certain types of DERs can reduce power quality and stability due to intermittent or unpredictable power generation.

Power conditioning and/or protective devices can be implemented to minimize the effect of some of the factors that influence the quality and stability of the power within the electrical grid infrastructure. However, completely different processes or devices are required to address each individual factor that can influence the quality and stability of the power. Moreover, the power conditioning and/or protective devices are typically calibrated or tuned based on predetermined measurements within the network or anticipated loading configurations.

Thus, electrical utility networks, especially at the distribution level, face several challenges in maintaining power quality and stability due to the nature of the loads connected to a three-phase power network. These challenges are elevated to the next level by having single phase loads and single phase distributed energy resources (DERs) in addition to three-phase loads connected to the network.

One challenge that electrical utility networks encounter in maintaining power quality is phase imbalance. In a three-phase power network system, an electrical utility can carefully plan in advance to distribute power in a balanced manner such that the voltage of each of the three different phases of the distributed power is substantially equal. However, various factors can influence an individual phase such that a voltage imbalance is generated in portions of the network that are out of the direct control of the electrical utility such as within an area electric power system. For example, when the network within the area electric power system is configured to support the combination of both single-phase loads and three-phase loads, if the single-phase loads are not evenly distributed across all three of the phases, the overall load requirement for each phase can be different causing a phase imbalance. This can result in underutilization of network infrastructure, and high neutral currents that can undesirably reduce network efficiency and lead to higher costs. Currently, significant effort is required to rebalance the loads within the area electric power system because single-phase loads must be physically moved from one phase to another in order to alleviate phase imbalance.

Poor power factor is another challenge that electrical utility networks encounter in maintaining power quality. The power factor for a system is based on the real or active power and the apparent power in the circuit and can be indicative of circulating currents between the power source and the load. Since a load with a lower power factor draws more current than a load with a higher power factor for the same amount of useful power transferred, a power factor can dynamically change within an area electric power system based on the number and type of loads associated with each phase. Most behind-the-meter DERs are not designed to deliver reactive power (VARs). In addition, while a few DERs can offer reactive power (VARs) along with active power (Watts), the few DERs capable of offering reactive power (VARs) cannot simultaneously or even selectively produce different power factors in different phases. When single phase non-unity power factor loads and single phase DERs are deployed, such as within an area electric power system, this configuration can create unequal VAR requirements across three phases within the area electric power system. A low power factor can result in high operating costs and poor efficiency for the same amount of energy delivered at a higher power factor. Moreover, different reactive power requirements in different phases can contribute to severe voltage imbalance across the three phases in the distribution system.

Another challenge that electrical utility networks encounter in maintaining power quality is current and/or voltage harmonics. Harmonics can be generated when certain type of loads, primarily non-linear loads and/or variable-frequency drives (VFDs), draw power from the circuit which can influence and distort the power signal and deteriorate power quality thereby generating high neutral currents and higher losses in other loads connected to load which can lead to poor efficiency. Dedicated active filters or harmonic trap filters have been implemented to produce harmonics locally to support the loads and reduce power quality deterioration within an area electric power system (EPS) (e.g., a microgrid). For example, dedicated active filters or harmonic trap filters can be tuned as required to one or more non-tripled odd harmonics (e.g., the $5^{th}$, $7^{th}$, $11^{th}$, $13^{th}$ harmonic frequencies). When all non-tripled odd harmonics are cancelled out within the area EPS, neutral currents are prevented from being generated as long as any harmonics present are in phase and equal in magnitude. However, if a single phase load creates harmonics in the distribution network that were not accounted for by the dedicated active filters or the harmonic trap filters, then any harmonics created by the single phase load can undesirably result in high neutral currents.

Moreover, in hybrid power systems, alternative direct current (DC) power sources can additionally or alternatively provide power to an area EPS. In addition, the alternative DC power sources can also be implemented as VARs, harmonics, and phase imbalance support within a network. However, while an alternative DC power source can be configured to provide support to maintain power quality and stability, the electric utility cannot accurately anticipate the VARs, harmonics, and phase imbalance support provided by the alternative DC power source due to various factors. For example, the alternative DC power sources that generate power using solar or wind heavily depend upon weather conditions. Since weather conditions are generally unpredictable, it is challenging for electric utilities to accurately anticipate the extent in which an alternative DC power source can provide power quality support within the network.

To the extent that a network addresses phase imbalance, poor power factor, harmonics, and the availability of an alternative DC power source, each of these technical challenges require separate equipment to overcome the different challenges. For example, capacitor banks are the primary choice for improving linear power factor, and active filters or harmonics trap filters can be implemented to address harmonics issues. As previously discussed, phase imbalance can be overcome by physically moving the loads from one phase to another, and a large energy storage can be used to generate single phase power to help aid over loaded phase.

It is desirable to maintain power quality and stability in an electrical grid infrastructure including a microgrid. The embodiments described herein include a hybrid fuel cell system that dynamically address some or all of the above issues using a single piece of equipment. For example, the embodiment hybrid fuel cell system can include an inverter configured to dynamically maintain power quality by monitoring and compensating for power quality deterioration factors. In some embodiments, the power quality deterioration factors can include one or more of phase imbalance, poor power factors, harmonics, or influences on the network contributable to alternative DC power source. In a first embodiment, the hybrid fuel cell system can use a fuel cell system as a primary alternative DC power source to support a base load of the area EPS and an energy storage device (e.g., batteries and/or supercapacitors) as a dispatchable resource to dynamically meet the load demand. The output power of both the energy storage device and fuel cell system are combined behind the inverter. In response to receiving a power command, the inverter can selectively pull power from the energy storage device and the fuel cell system depending on availability. The inverter can issue separate commands to dictate how much power should come from each of the individual alternative DC power sources.

In some embodiments, the inverter can provide positive, negative, and zero sequence components (e.g., first, second, and third phase components) to supply imbalanced currents to the area EPS in order to support imbalance loading on a three-phase, four wire network. The inverter can be configured to dynamically establish balance between different phases by producing more current on an overloaded phase and less current on an underloaded phase. The dynamic balancing of the different phases can be achieved through various ways, such as, for example: 1) receiving per-unit (pu) values of positive, negative, and zero sequence commands from the electric utility or an external controller through communication; 2) monitoring individual phase currents in a feeder or the area EPS and adjusting DER currents to match the imbalance; 3) monitoring individual phase voltages in the feeder or area EPS and adjusting DER currents to make all phase voltages same; or 4) monitoring a neutral current and adjusting line currents to generate a neutral current of zero in case of pure resistive loads.

In an embodiment, a single inverter circuit can provide automatic load balancing, individual phase harmonics compensation, and/or individual phase power factor while generating active power through an alternative DC power source powered using renewable sources. By including a battery in the inverter circuit, the inverter circuit can be available to provide additional grid support to improve power quality and stability.

In an alternative embodiment, different alternative DC power sources such as solar power sources or AC power sources such as wind turbines which include an AC to DC rectifier may be used along with (or instead of) a fuel cell, as long as the grid interface is inverter-based technology.

In another alternative embodiment, when an alternative DC power source (fuel cell, battery, or any other source) is not available for whatever reason, the inverter can take energy from an underutilized phase and deliver that energy to the overload phases. Likewise, the inverter can perform similarly for reactive power and harmonics. The embodiments described herein are helpful in maintaining stability of microgrids.

The embodiments of the present disclosure provide advanced and reliable support to utility grid and microgrid to maintain stability. It may allow users to reduce circuit complexity by removing duplicate equipment and using only one advanced inverter. Also, it may allow users to use "green" power to provide all the support.

Referring to FIG. 1, a fuel cell system according to an embodiment includes a UPM 102, an input/output module (IOM) 104 and one or more power modules 106. The power module 106 comprises a first housing, the IOM 104 comprises a second housing which is separate from the first housing, and the uninterruptible power module 102 comprises a third housing which is separate from the first and the second housings. If there is more than one power module 106, for example six to ten modules 106, then each power module may comprise its own housing. Each housing may comprise a cabinet or another type of full or partial enclosure, for example the cabinet described in U.S. application Ser. No. 12/458,355, filed on Jul. 8, 2009 and incorporated herein by reference in its entirety. The modules may be arranged in one or more rows or in other configurations.

The UPM 102 includes at least one DC/AC inverter 102A. If desired, an array of inverters may be used. Any suitable inverter known in the art may be used. The UPM 102 optionally contains an input rectifier, such as an input diode 102B which connects to the output of a DC bus 112 from the power module(s) 106 and to the input of the at least one inverter 102A. The UPM also optionally contains a boost PFC rectifier 102C which connects to the output the electric grid 114, such as a utility grid, and to the input of the at least one inverter 102A.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The DC/DC converters 106B may be located in the IOM 104 instead of the power module 106.

The power module(s) 106 may also optionally include an energy storage device 106C, such as a bank of supercapacitors or batteries. Device 106C may also be connected to the DC bus 112 using one or more DC/DC converters 106D.

The UPM 102 is connected to an input/output module (IOM) 104 via the DC bus 112. The DC bus receives power from power modules 106.

The fuel cell system and the grid 114 are electrically connected to a load 108 using a control logic unit 110. The load may comprise any suitable load which uses AC power, such as one or more buildings, appliances, lights, tools, air conditioners, heating units, factory equipment and machinery, power storage units, computers, security systems, etc. The control logic unit includes a switch 110A and control logic 110B, such as a computer, a logic circuit or a dedicated controller device. The switch may be an electrical switch (e.g., a switching circuit) or an electromechanical switch, such as a relay.

Control logic 110B routes power to the load 108 either from the UPM 102 or from the grid 114 using switch 110A. The at least one fuel cell segment 106A and storage device 106C from module 106 are electrically connected in parallel to the at least one first inverter 104A in IOM and to the at least one second inverter 102A in the UPM 102. The at least one first inverter 104A is electrically connected to the load 108 through the electrical grid 114 using switch 110A in the first position. In contrast to the circuit shown in U.S. patent application Ser. No. 12/148,488 (filed May 2, 2008 and entitled "Uninterruptible Fuel Cell System"), the grid 114 in FIG. 1A is directly connected to the load 108 through the control logic unit 110 without passing through a bidirectional inverter. The at least one second inverter 102A is electrically connected to the load 108 with the switch 110A in the second position without using the electrical grid 114 (i.e., the output of the fuel cell segment 106A does not have to pass through the grid 114 to reach the load 108).

Thus, the control logic 110B selects whether to provide power to the load from the electrical grid 114 (or from the fuel cell segment 106A through the grid) or through the at least one second inverter 102A. The control logic 110B may determine a state of the power modules and select a source to power the load 108 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:

A path to the load 108 from the AC grid 114.

A path from the AC grid 114 through the IOM 104 to storage elements 106C of power modules 106 (for example, supercapacitors or batteries).

A path from the storage elements 106C of the power modules 106, over the DC bus 112 to the IOM 104 and the UPM 102 in parallel. The DC bus delivers DC to the inverter in the UPM 102. The inverter 102A in the UPM 102 or inverter 104A in IOM 104 delivers AC power to the load 108 depending on the position of the switch 110A.

A path from the power modules 106 (which may include power from the fuel cell segment(s) 106A and/or the storage elements 106C of the power modules 106), over the DC bus 112 to the IOM 104 and the UPM 102. The DC bus delivers DC voltage to the inverter in the UPM 102. The inverter 102A in the UPM 102 delivers AC power to the load 108. Power in excess of the power required by the load 108 is delivered to the AC grid through an inverter 104A in the IOM 104. The amount of power that is delivered to the AC grid 114 will vary according the demands of the load 108. If the amount of power required by the load 108 exceeds the power provided by the power modules 106, the additional power demand may be supplied by the AC grid 114 directly to the load 108 through switch 110A in the first position or to the UPM 102 with the switch 110A in the second position. The grid power is rectified in rectifier 102C in UPM 102 and provided to the inverter 102A in the UPM 102 and converted back to AC for powering the load 108.

FIGS. 1B-1K illustrate various modes of operation of the system shown in FIG. 1A. While the embodiments described below illustrate a load 108 which requires 100 kW of power and the fuel cell segment(s) 106A which output 200 kW of power in steady state, these values are provided for illustration only and any other suitable load and power output values may be used.

Figure 1B:
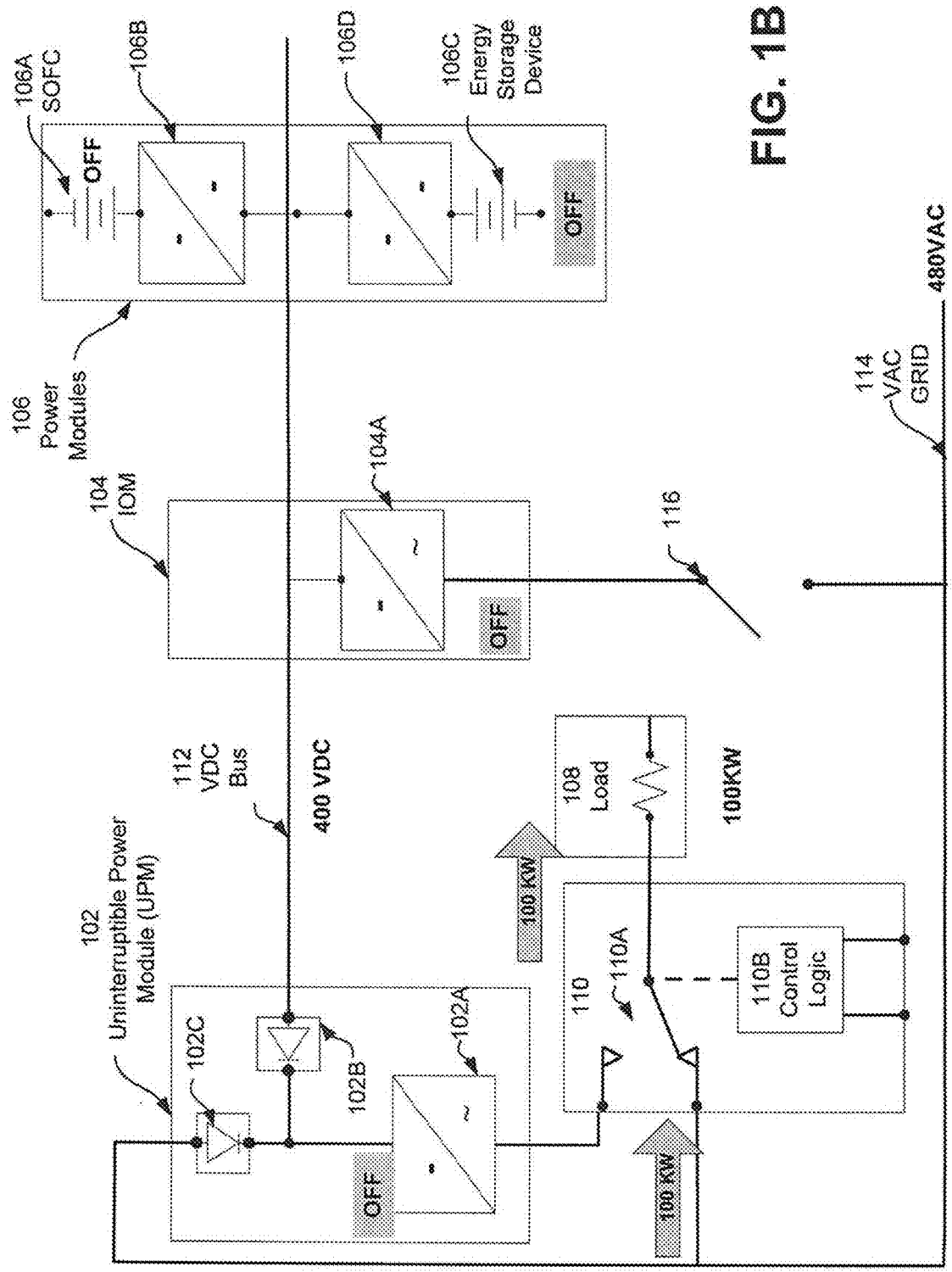
FIGS. 1B to 1K illustrate the system of FIG. 1A in various modes of operation.

FIG. 1B illustrates the system operation during the installation of the system and/or during a period when the load 108 receives power from the grid 114. As shown in this figure, the fuel cell segment(s) 106A and the energy storage device 106C are in the OFF state, the IOM 104 inverter 104A and the UPM inverter 102A are both in the OFF state and the second switch 116 is open such that there is no electrical communication between the IOM and the grid. The control logic switch 110A is in the first position to provide power from the grid 114 to the load 108 through the control logic module 110. As shown in the figure, 100 kW of power is provided from the grid to the load through the control logic module.

Figure 1C:
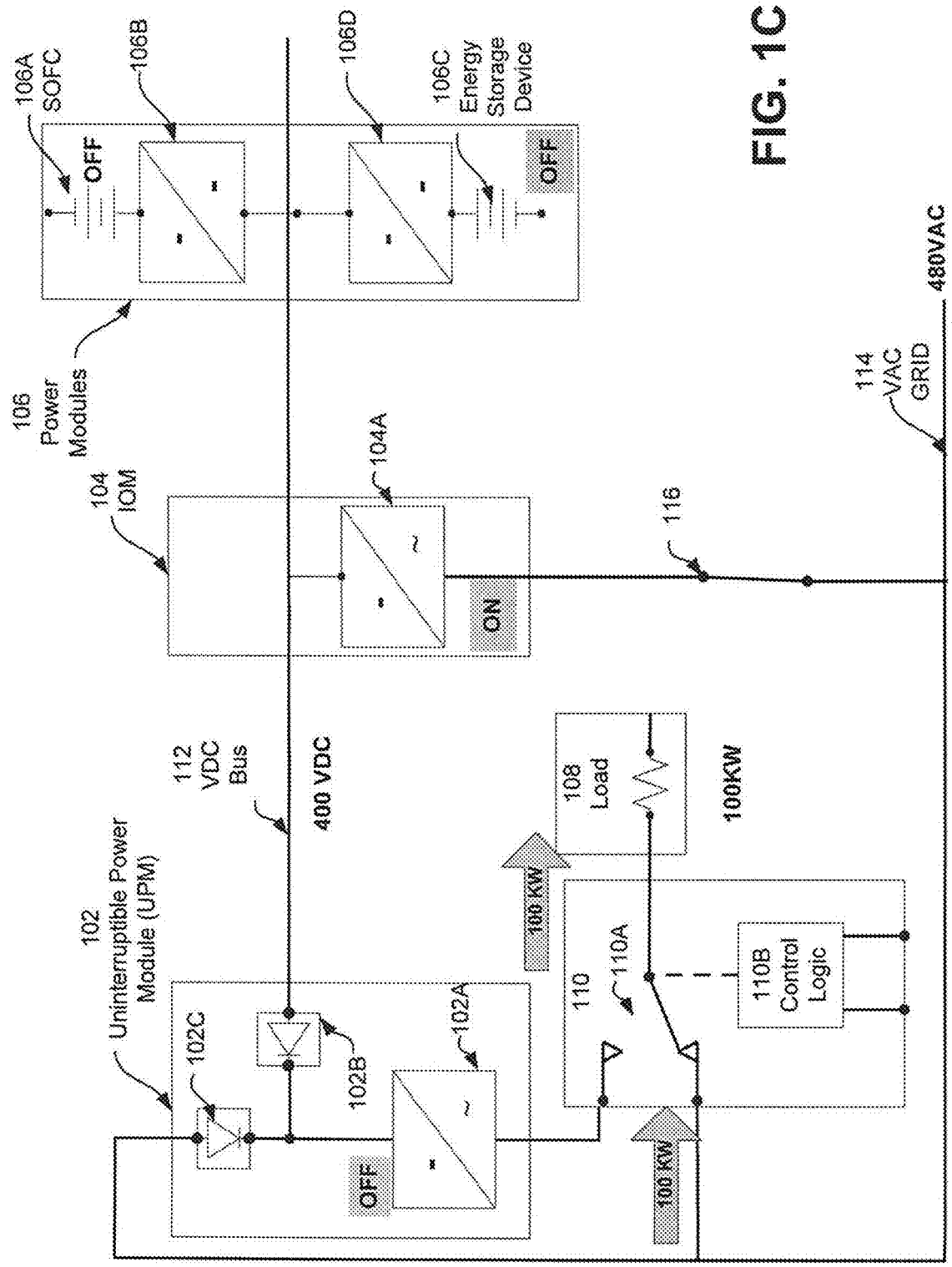

FIG. 1C illustrates the system operation during IOM start-up and charging of the energy storage device (e.g., bank of supercapacitors)106C from the grid 114 while the load 108 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 102A is in the OFF state. The second switch 116 is closed such that there is electrical communication between the IOM and the grid to provide power from the grid 114 to the energy storage device 106C through the IOM 104 inverter 104A and the DC bus 112. The control logic switch 110A is in the first position to provide power from the grid 114 to the load 108 through the control logic module 110. As shown in the figure, 100 kW of power is provided from the grid to the load through the control logic module.

Figure 1D:
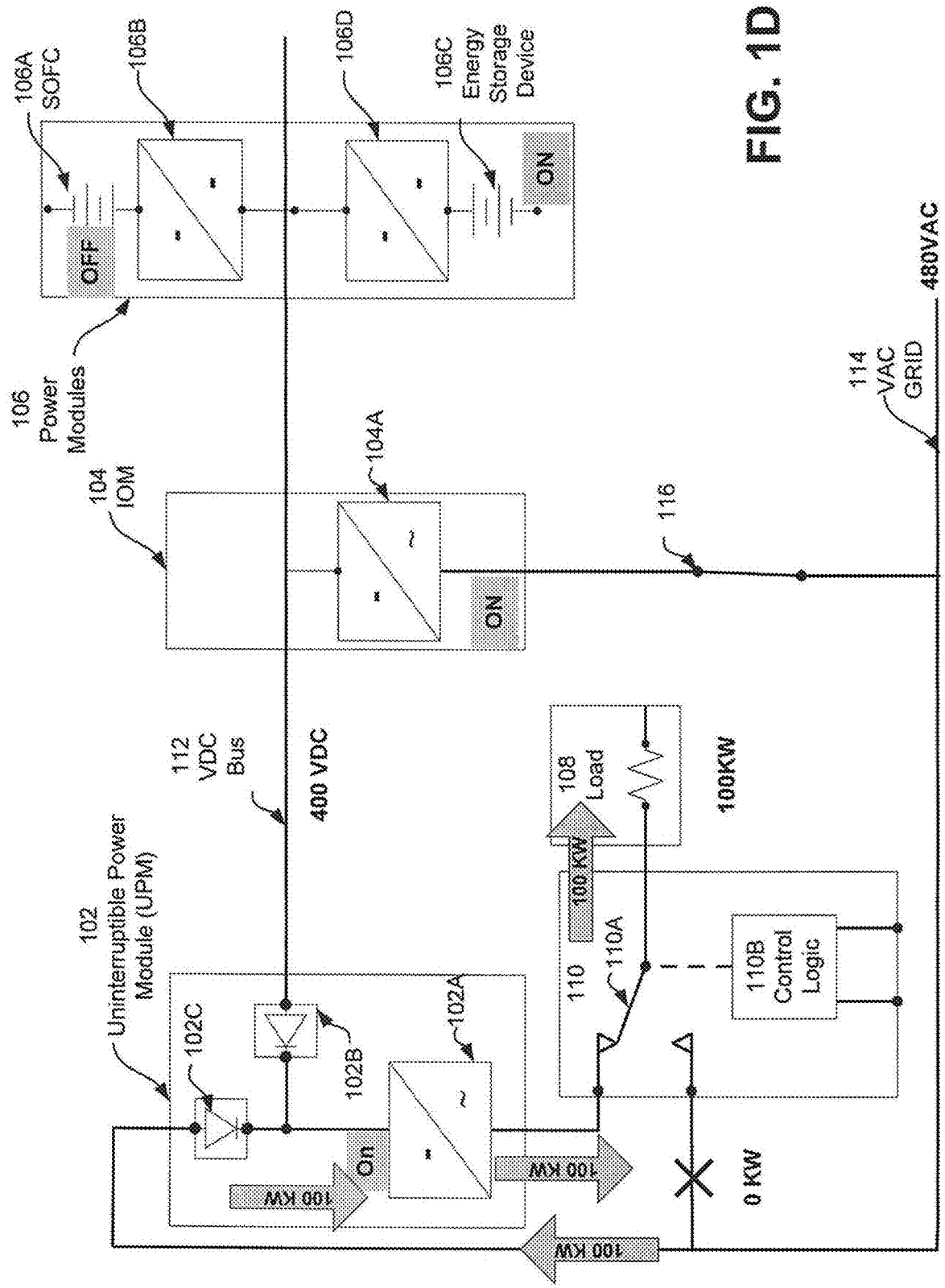

FIG. 1D illustrates the system operation during UPM start-up following IOM start-up. UPM functions by receiving power from the energy storage device 106C. UPM provides the power from the energy storage device 106C to the load 108. As shown in this figure, the fuel cell segment(s) 106A are in the OFF state while and the energy storage device 106C is in the ON state. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the UPM 102 to the load 108 through the control logic module 110. As shown in the figure, 100 kW of power is provided from the grid 114 to the load 108 through the rectifier 102C and inverter 102A of the UPM 102 and then through the control logic module. Some power may also be provided to the load 108 from the energy storage device 106C via the DC bus 112, UPM 102 and control logic module.

Figure 1E:
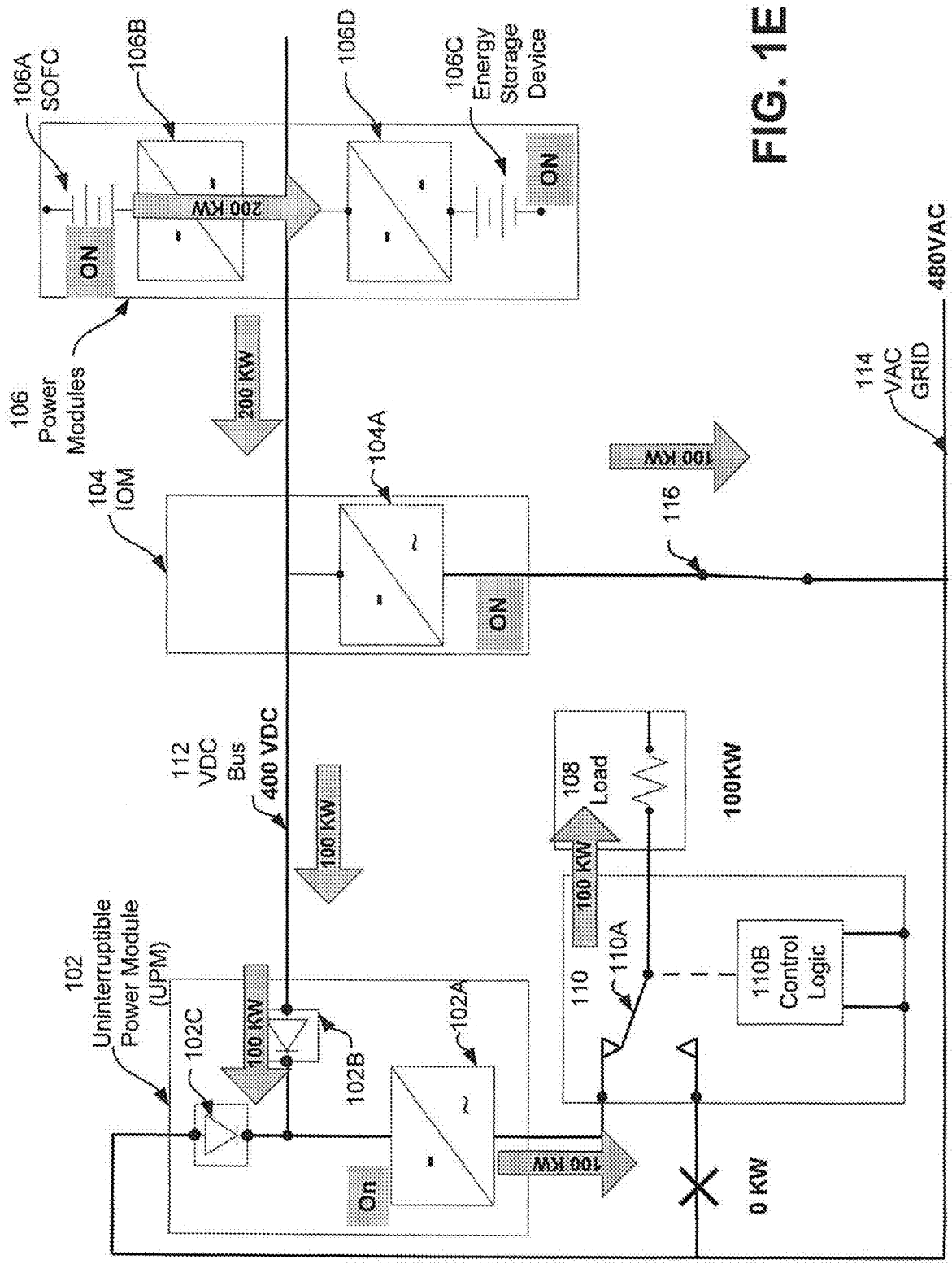

FIG. 1E illustrates the steady state operation of the system. In this mode the fuel cell segment(s) 106A is in the ON state to power the load 108. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 102A is in the ON state. The 200 kW power output is split between the grid 114 and the load 108. The second switch 116 is closed such that there is electrical communication between the IOM and the grid to provide 100 kW of power from the fuel cell segment(s) 106A to the grid.

The control logic switch 110A is in the second position to provide the other 100 kW of power from the fuel cell segment(s) 106A in the power module 106 through the DC bus passing through IOM 104 and through the inverter 102A of the UPM 102 and then through the control logic module 110 to the load 108. Preferably, this 100 kW of power does not pass through the IOM inverter 104A and/or the grid 114 to reach the load 108. While a 200 kW power output split 50/50 between the grid and the load is described above, different power outputs may be used as needed, such as 25 kW to 1000 kW, which may be split 10/90 to 90/10 between the grid and the load.

Figure 1F:
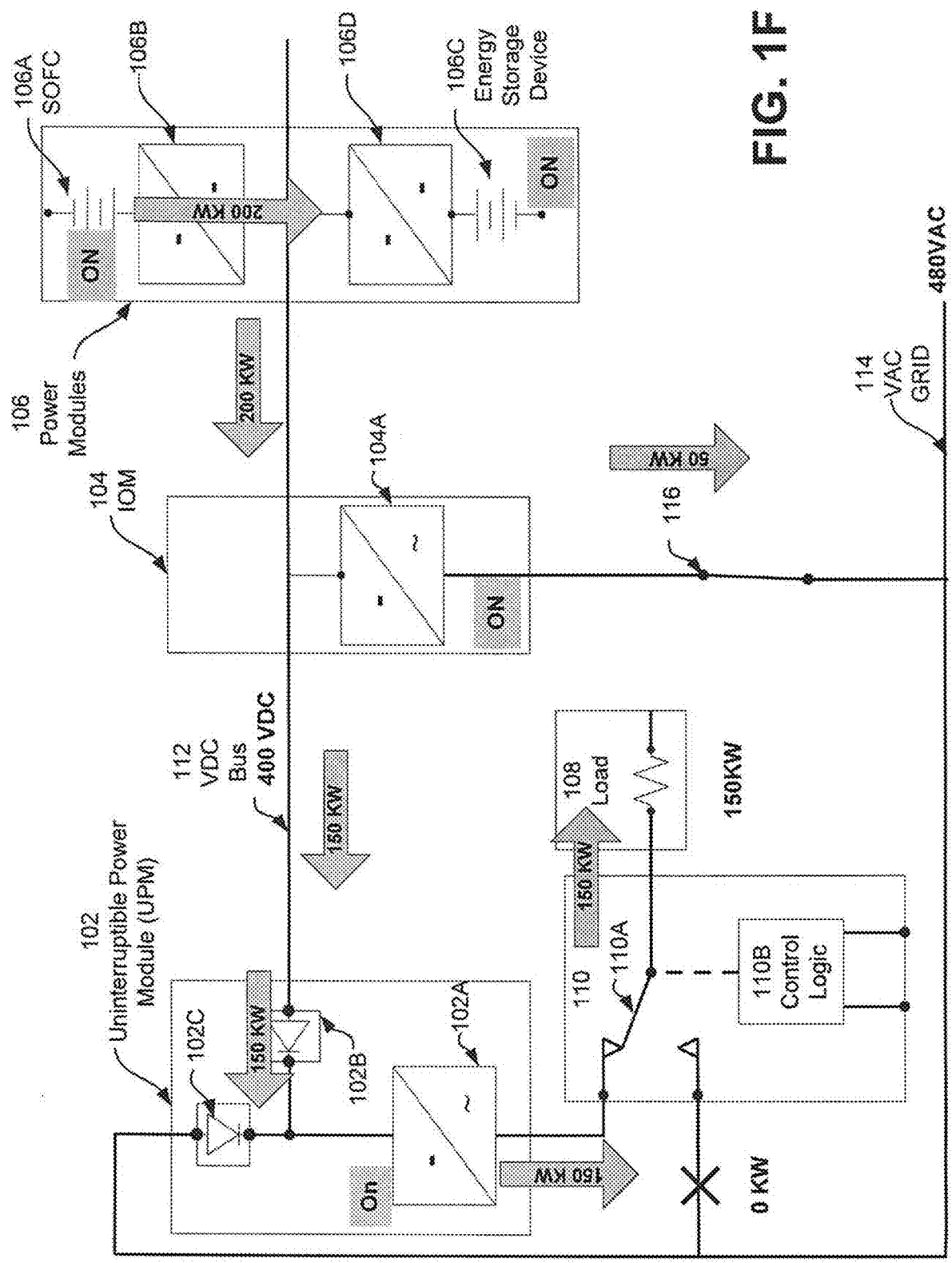

FIG. 1F illustrates operation of the system during a relatively steady load 108 increase from 100 kW to 150 kW (i.e., when the load requires more power than prior steady state operation). In this mode, more of the power output of the fuel cell segment(s) is provided to the load and less of this power output is provided to the grid than in the stead state mode described above. If desired, 100% of the power output may be provided to the load and 0% to the grid. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid to provide 50 kW of power from the fuel cell segment(s) 106A through the IOM inverter 104A to the grid 114.

The control logic switch 110A is in the second position to provide 150 kW of power from the fuel cell segment(s) 106A in the power module 106 through the DC bus passing through IOM 104 and through the inverter 102A of the UPM 102 and then through the control logic module 110 to the load 108. Thus, the power output of the fuel cell segment(s) 106A is preferably split between the grid and the load in this mode. Preferably, the power does not pass through the IOM inverter 104A and/or the grid 114 to reach the load 108.

Figure 1G:
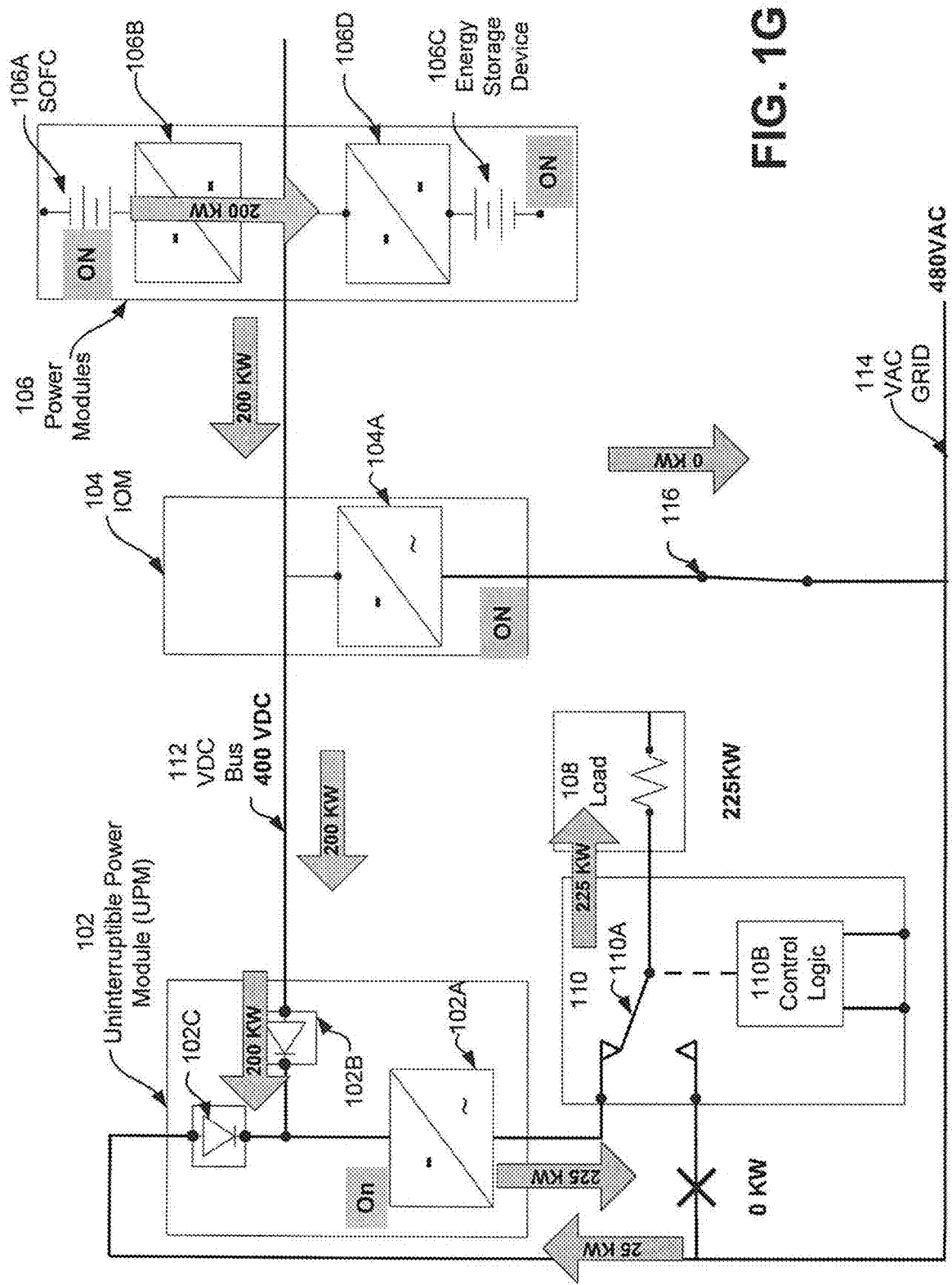

FIG. 1G illustrates operation of the system during a sudden load 108 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. However, no power is provided from fuel cell segment(s) 106A through the IOM inverter 104A to the grid 114 due to the load spike.

The control logic switch 110A is in the second position to provide power from the fuel cell segment(s) 106A in the power module 106 and from the grid 114 through the DC bus passing through IOM 104 and through the inverter 102A of the UPM 102 and then through the control logic module 110 to the load 108. In this mode, the power to the load is provided from both the fuel cell segment(s) and the grid. As shown, 200 kW from the segment(s) 106A is provided through the DC bus 112, diode 102B, inverter 102A and switch 110A to the load 108, while 25 kW is provided from the grid 114 through the rectifier 102B, inverter 102A and switch 110A to the load 108 to achieve a total 225 kW of power required by the load. Preferably, the power from the fuel cell segment(s) does not pass through the IOM inverter 104A and/or the grid 114 to reach the load 108.

Figure 1H:
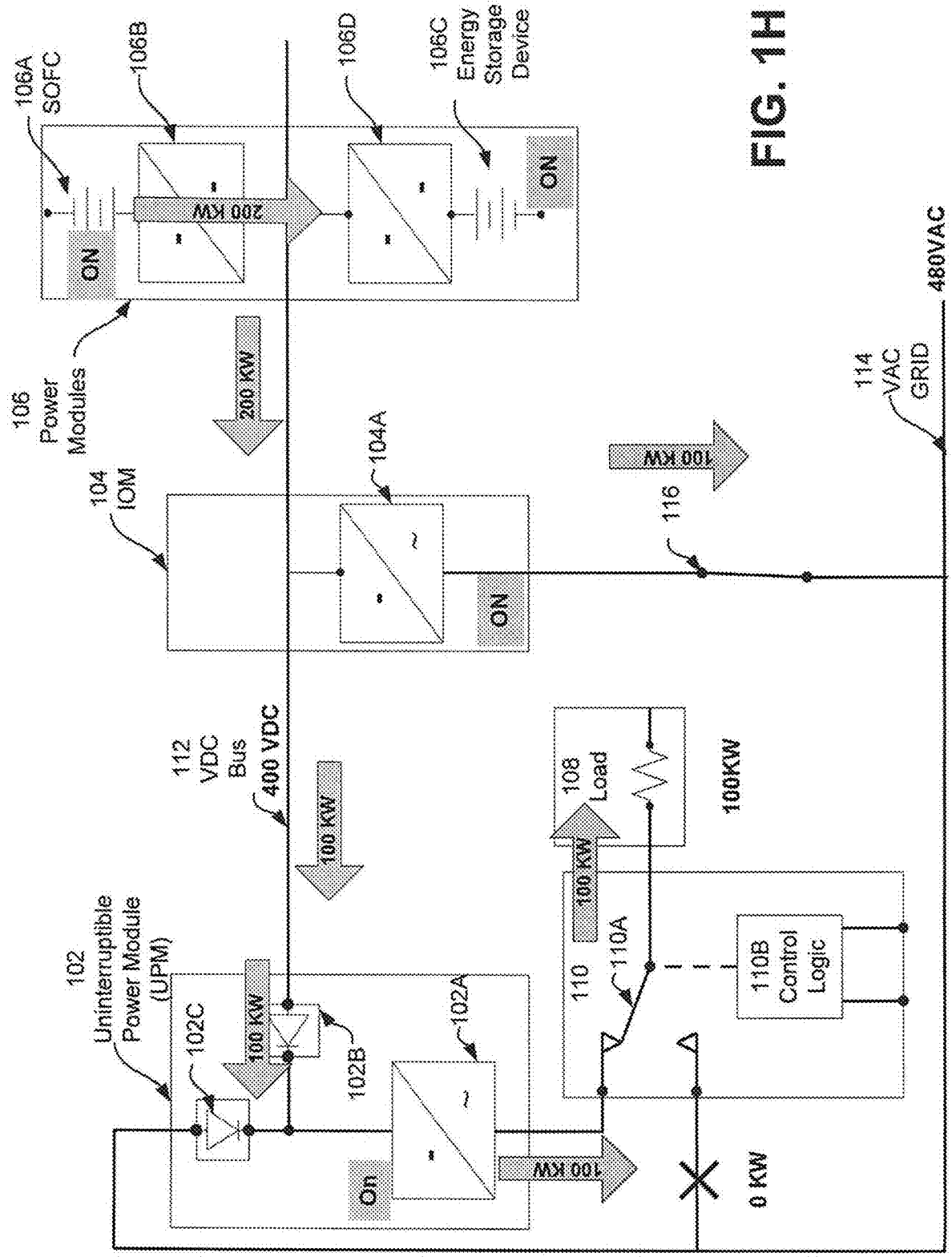

FIG. 1H illustrates operation of the system during a return to normal or steady state operation after the sudden load 108 spike. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 102B, inverter 102A and switch 110A to the load 108. Preferably, the power does not pass through the IOM inverter 104A and/or the grid 114 to reach the load 108.

Figure 1I:
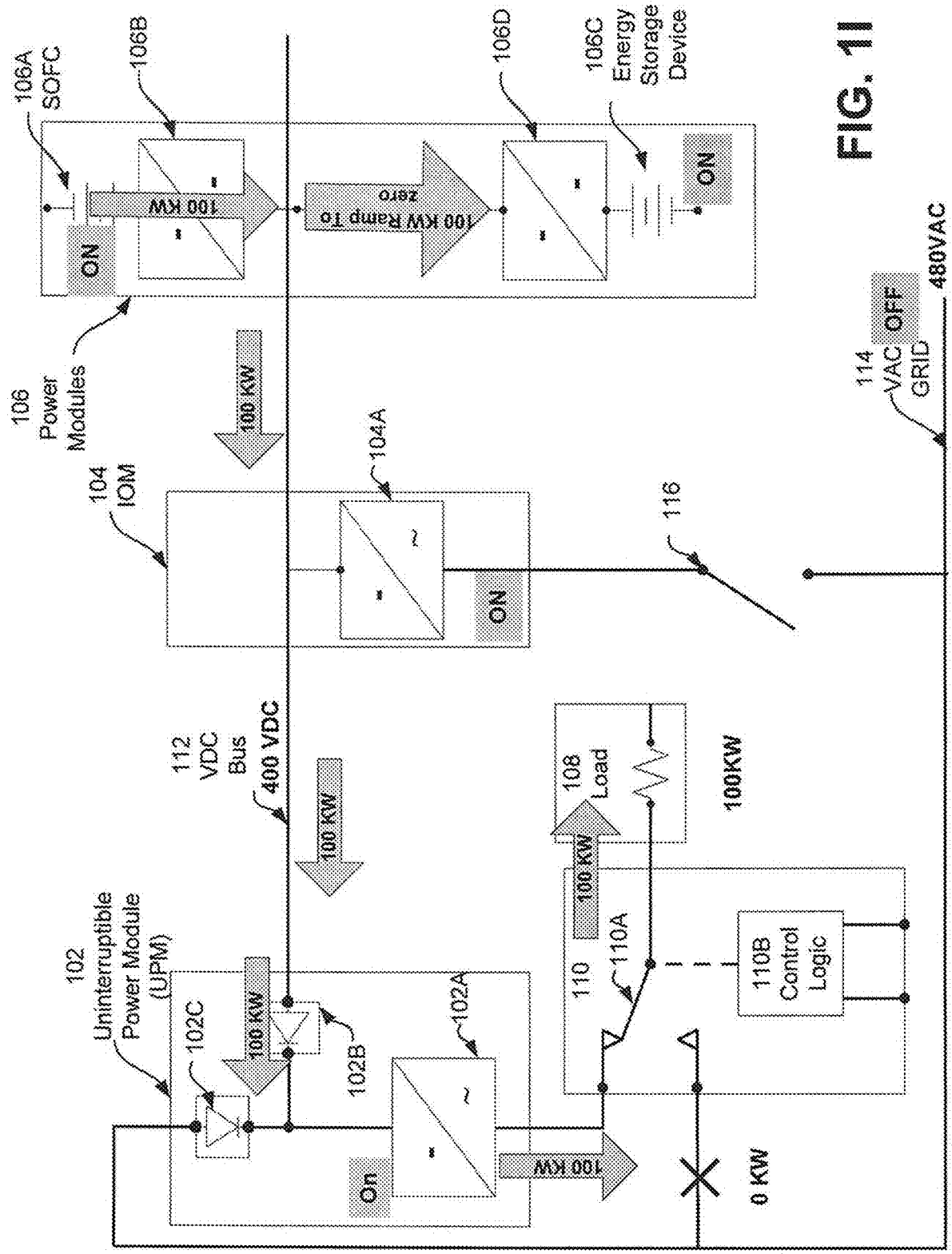

FIG. 1I illustrates operation of the system during loss of power from the grid 114 (e.g., during a black out). The fuel cell segment(s) 106A is in the ON state to power the load 108. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 102A is in the ON state. The second switch 116 is opened such that there is no electrical communication between the IOM and the grid. A sensor can sense the loss of grid power and a controller can open the switch 116 in response to the sensed grid outage. The control logic switch 110A is in the second position to provide power from the fuel cell segment (s) 106A in the power module 106 through the DC bus passing through IOM 104 and through the inverter 102A of the UPM 102 and then through the control logic module 110 to the load 108. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 102B, inverter 102A and switch 110A to the load 108. The power output of the segment(s) 106A is then gradually reduced to 100 kW to meet the requirements of the load 108.

Figure 1J:
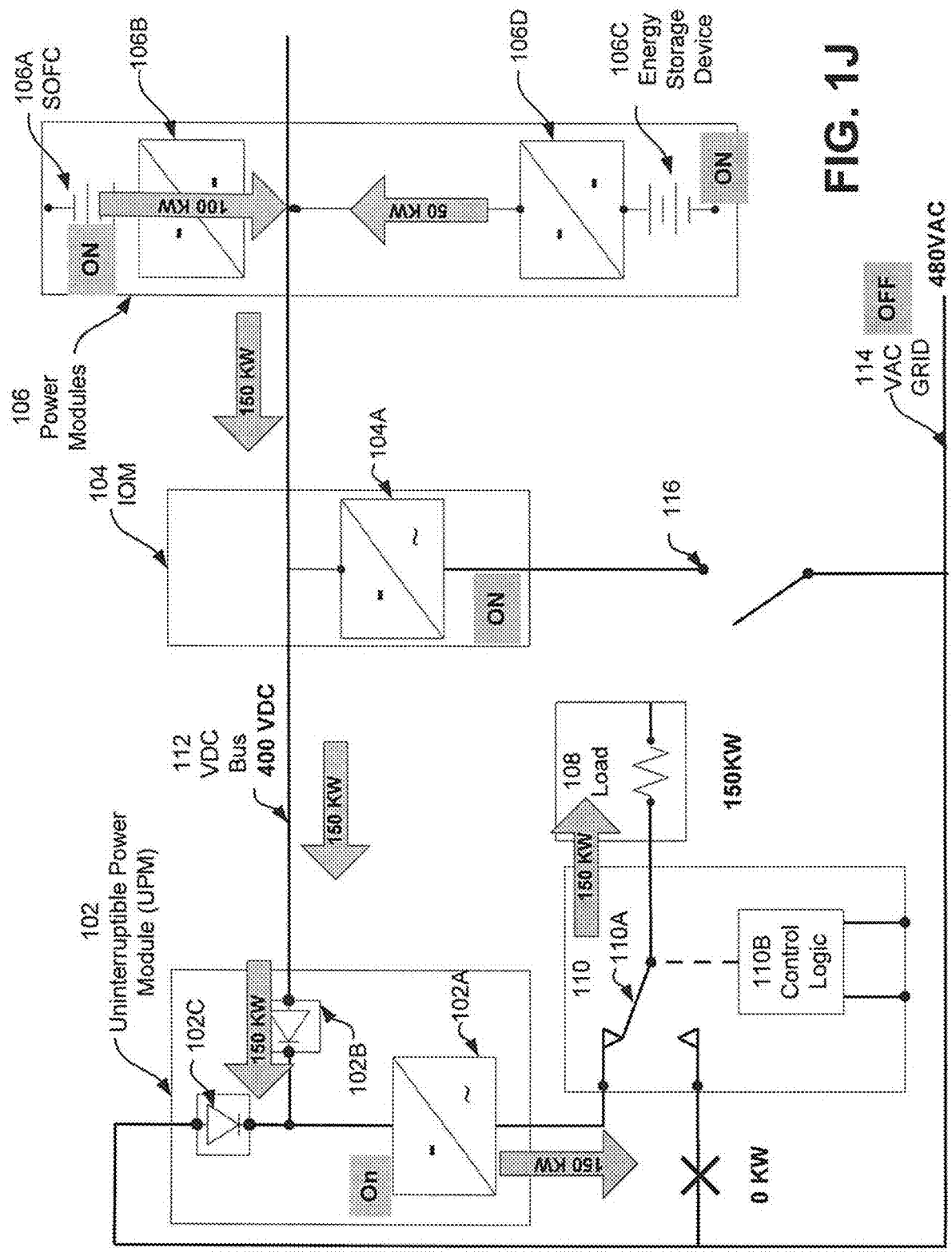

FIG. 1J illustrates operation of the system during loss of power from the grid 114 (e.g., during a black out) and in case of a load transient (e.g., increased demand for power from load 108) while the fuel cell segment(s) output a reduced amount of power (e.g., 100 kW) which meets the steady state requirements of the load. The fuel cell segment(s) 106A is in the ON state to power the load 108. As shown in this figure, the energy storage device 106C is in the ON state to provide additional power to the load 108. The IOM 104 bi-directional inverter 104A is in the ON state and the UPM inverter 102A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through IOM 104 and through the inverter 102A of the UPM 102 and then through the control logic module 110 to the load 108. In this mode, 100 kW from the segment(s) 106A and 50 kW from the energy storage device is provided to the DC bus 112. Thus, the DC bus 112 provides the 150 kW of power from IOM 104 through diode 102B, inverter 102A and switch 110A to the load 108. Preferably, the power does not pass through the IOM inverter 104A and/or the grid 114 to reach the load 108.

Figure 1K:
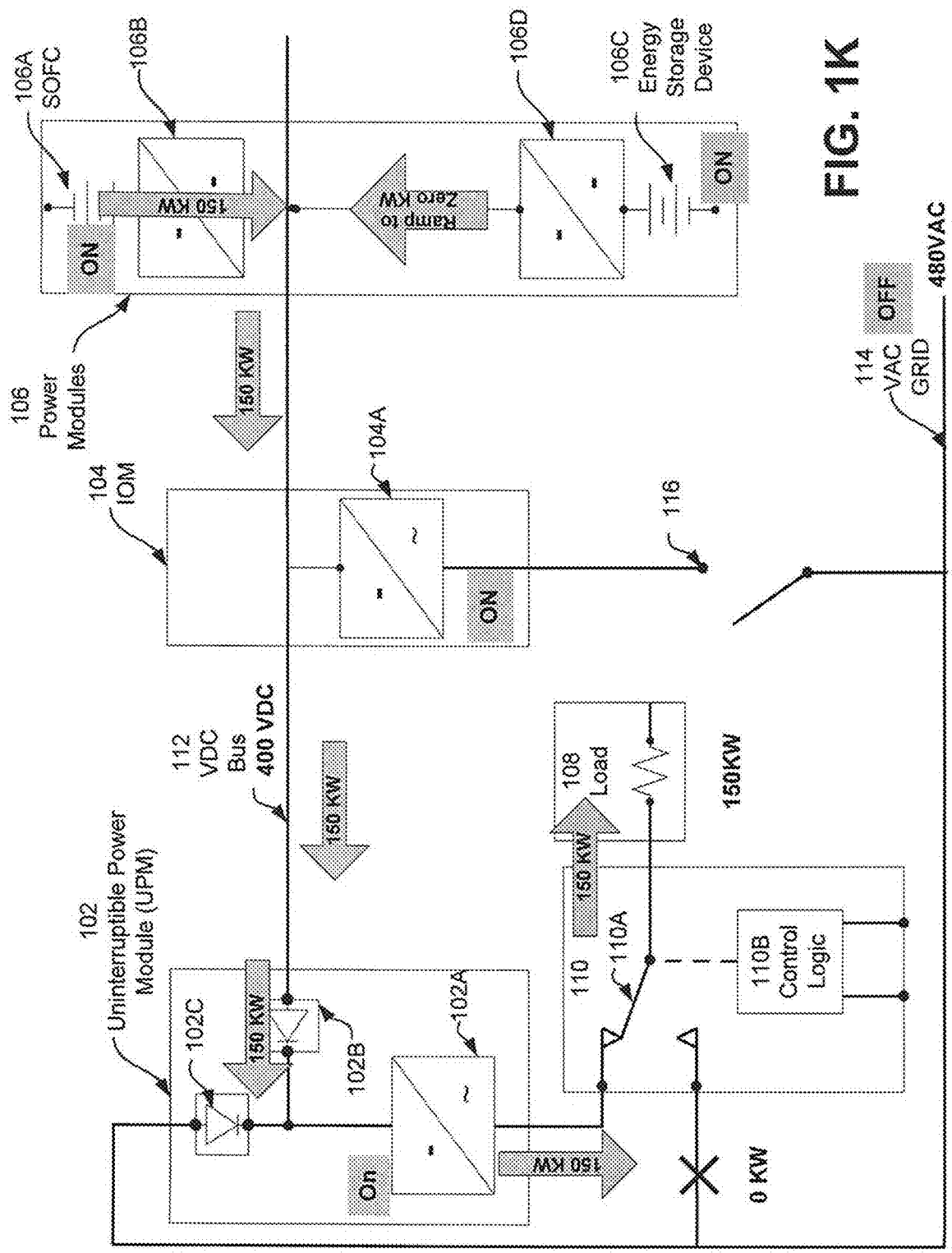

FIG. 1K illustrates operation of the system during loss of power from the grid 114 (e.g., during a black out) and in case of a continuing load transient (e.g., continued increased demand for power from load 108). The operation is the same as that shown in FIG. 1J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segment(s) 106A and less and less power from the energy storage device 106C until all of the required power is supplied to the load 108 by the fuel cell segment(s). Thus, the energy storage device acts as a bridging power source during the initial load transient and is then phased out during the continuing load transient.

Figure 2:
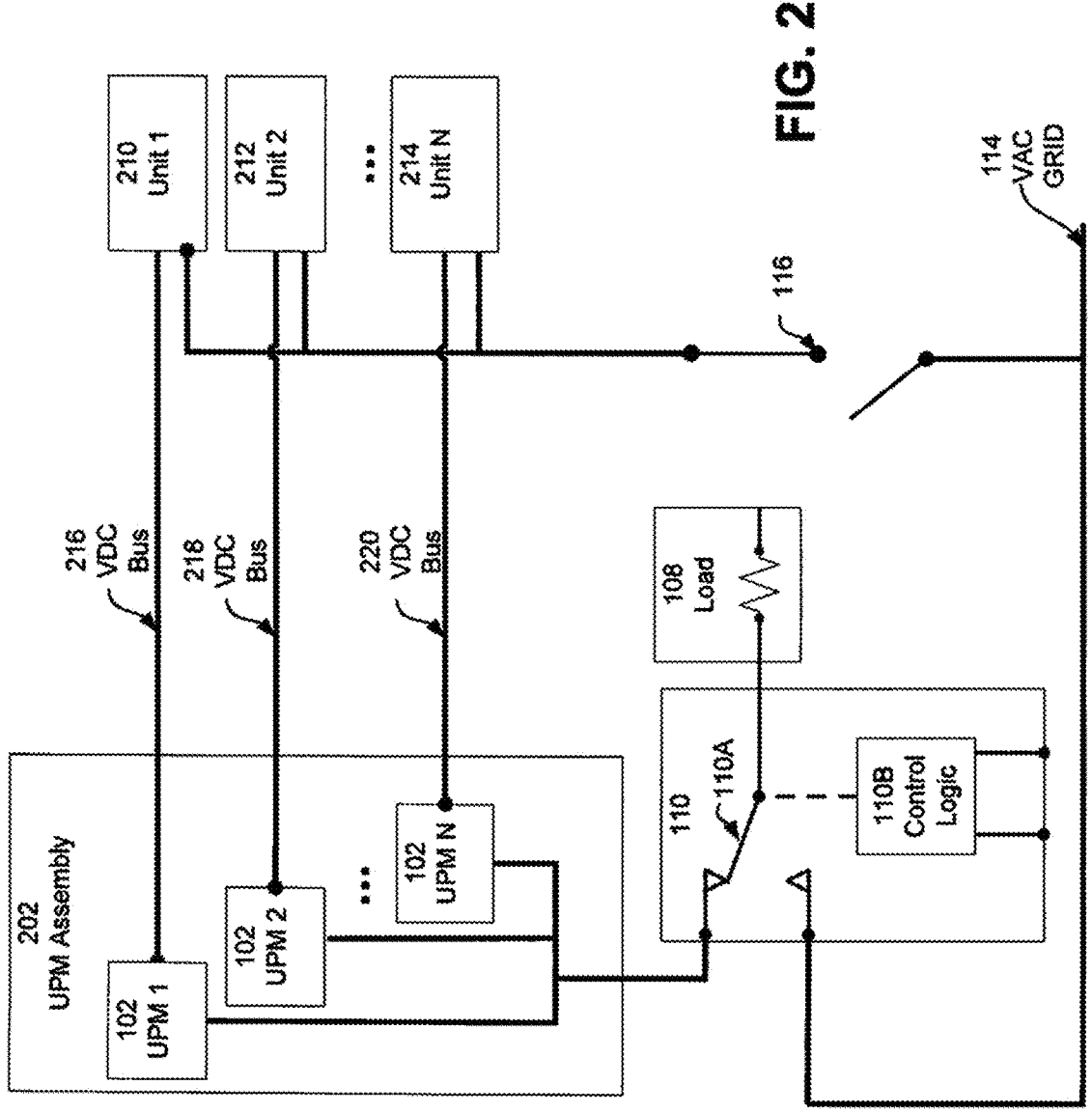
FIGS. 2 and 3 are block diagrams illustrating a DC microgrid according to an embodiment.
Figure 3:
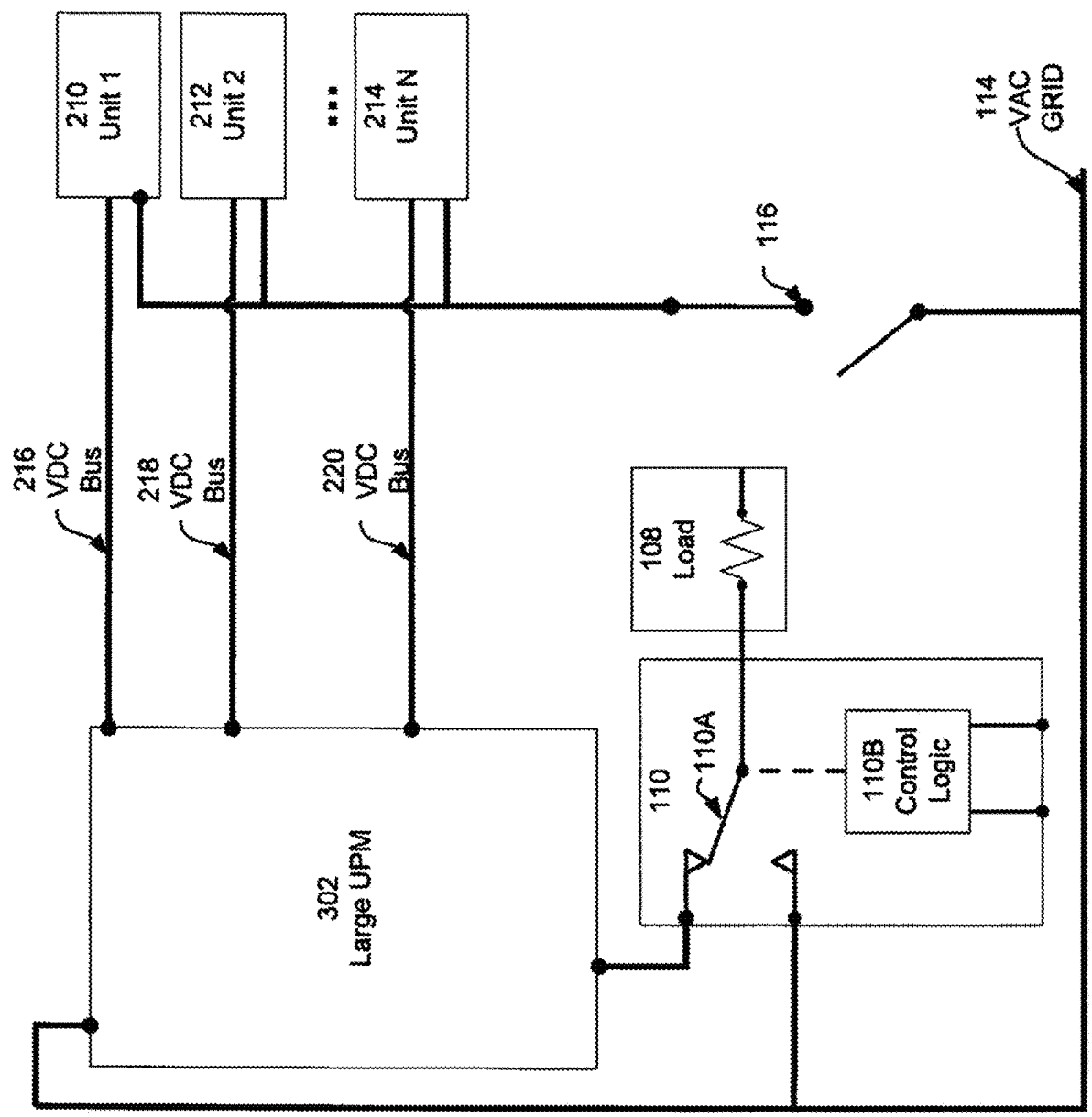

Referring to FIGS. 2 and 3, the output of the DC sources 1 to N are paralleled at the DC-output point, and a DC bus is created. Each DC source 1 to N may comprise one or more power module(s) 106 and an associated IOM 104. The 1 to N sources feed the customer load via a single UPM. Thus, the plurality of power module/IOM pairs share a common UPM. For example, the DC bus may form a DC micro grid connecting any number of DC sources (e.g., SOFC and power conditioning systems) together at one UPM. The UPM 202 may be a large assembly of individual UPM's 102 shown in FIG. 1A capable of output of many multiples of the output of the SOFC systems themselves. As illustrated, in FIG. 2, the UPM 202 comprises "N" UPMs 102 (i.e., one UPM for each DC source), with a separate DC bus connecting each DC power source to a dedicated UPM 102. The N UPM's 102 may be arranged in close proximity (e.g., side by side) in one housing or in separate housings to form the UPM assembly 202.

In an alternative embodiment shown in FIG. 3, the assembly 202 of smaller dedicated UPM's 102 may be replaced by one large UPM 302. In this embodiment, the UPM 302 may include an electrical storage device (e.g., bank of batteries or supercapacitors) and/or a synchronous motor. In general, UPM inverters may include rotating machinery (e.g., a motor, flywheel, etc.) to enhance stored energy content and/or increase reliability and inertia of output.

In summary, the DC sources may comprise fuel cell power modules and an IOM. The inverter within each UPM may be a modular assembly of smaller inverters controlled as one large inverter acting with inputs and/or outputs in parallel. An inverter within the main IOM may be a modular assembly of smaller inverters which are controlled as one large inverter acting with inputs and/or outputs in parallel.

In an embodiment, rectification is provided in the UPM to allow feed from the grid when the stacks are off-line, thus providing the load a protected bus. A boost converter may be used to maintain a good power factor to the grid.

In another embodiment, power from stored energy within an SOFC system or the UPM is used to create a "UPS" unit which has three energy inputs: grid energy; SOFC segment energy; and stored energy (e.g., ultracapacitors or batteries).

In yet another embodiment, a DC micro-grid is connected to other distributed generators such as solar power hardware or wind power hardware.

In an embodiment, the DC micro-grid is connected to DC loads such as the loads of DC data centers or DC vehicle chargers.

In yet another embodiment, when an IOM and UPM are composed of a cluster of inverters acting in parallel, some or all these inverters may be de-energized depending upon customer load conditions. For example, in a 200 kW generation capacity scenario where the customer load is 150 kW, the IOM inverters may be de-energized such that they only support 50 kW instead of a full 200 kW of grid-tied output. Further, in this scenario, it may be that only a portion of the possible inverters in the IOM assembly may be installed into the IOM, thus providing cost savings in terms of equipment required to support the specific customer load scenario.

Figure 4:
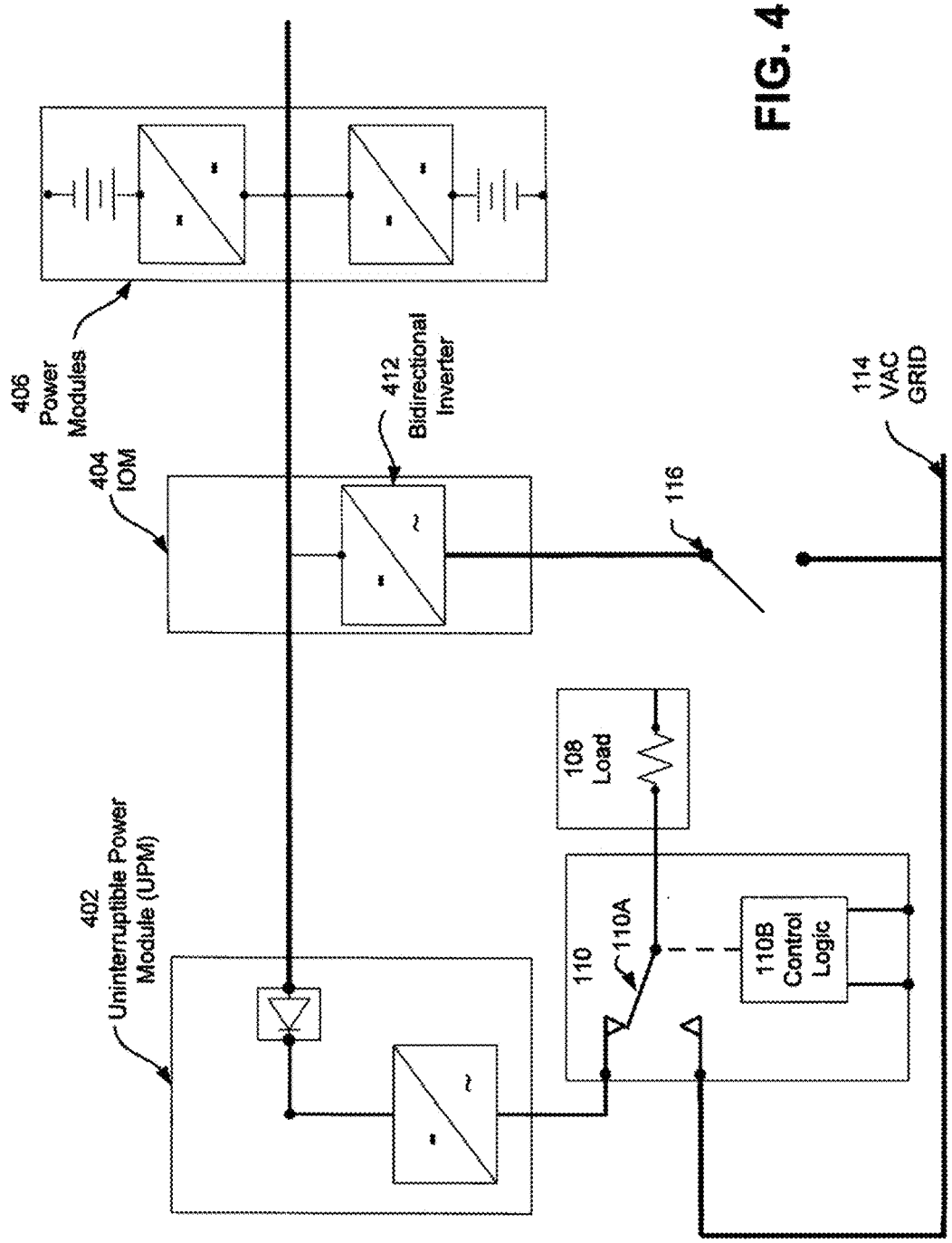
FIG. 4 is a block diagram illustrating an IOM comprising an inverter that is configured for "bi-directional" operation according to an embodiment.

Referring to FIG. 4, in an embodiment, an IOM 404 comprises inverters 412 that are configured for "bi-directional" operation. Such an inverter may have four-quadrant operation. If the grid-tied inverter has "bi-directional" operation, then the rectified feed does not need to be supplied to the UPM 402. Grid power during start-up may come through the grid tied inverter 412 instead of via a rectified input to the UPM 402. This embodiment also provides power from power module(s) 406 for protection of the customer load.

Figure 5:
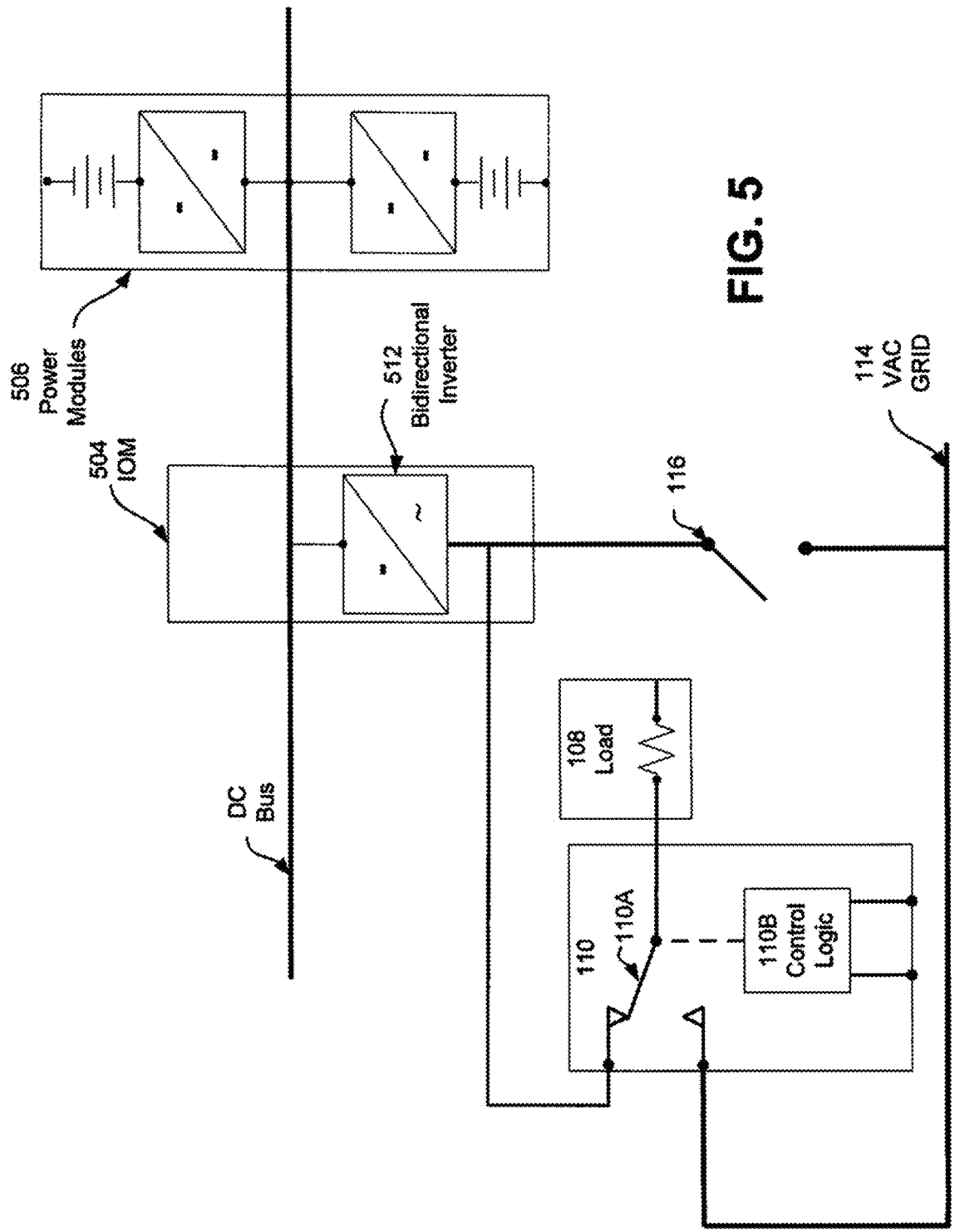
FIG. 5 is a block diagram illustrating an IOM comprising an inverter that is configured for dual mode functionality according to an embodiment.

Referring to FIG. 5, in an embodiment, a UPM is not utilized. In this embodiment, an IOM 504 comprises an inverter 512 that is configured for dual mode functionality. The dual mode inverter 512 is configured to operate with a grid reference and also in a stand-alone mode, supporting a customer load without a grid reference. In this embodiment an output power interruption would be required in order to switch between power generation in one mode and another mode.

FIGS. 6A-6D illustrate various modes of operation of the system shown in FIG. 1A. in which an electric vehicle (EV) charging module (ECM) is used instead of or in addition to the UPM 102. In some modes of operation the ECM may perform the functions of the UPM.

The systems of FIGS. 6A-6D offer several advantages when used in EV charging application. In particular, these systems remove the need for the grid to supply large peaks of power during quick charging of a large number of EVs. The systems can also be used for EV charging in areas where it would be too expensive to provide grid power, and where it would be more cost effective to lay a natural gas pipeline.

Figure 6A:
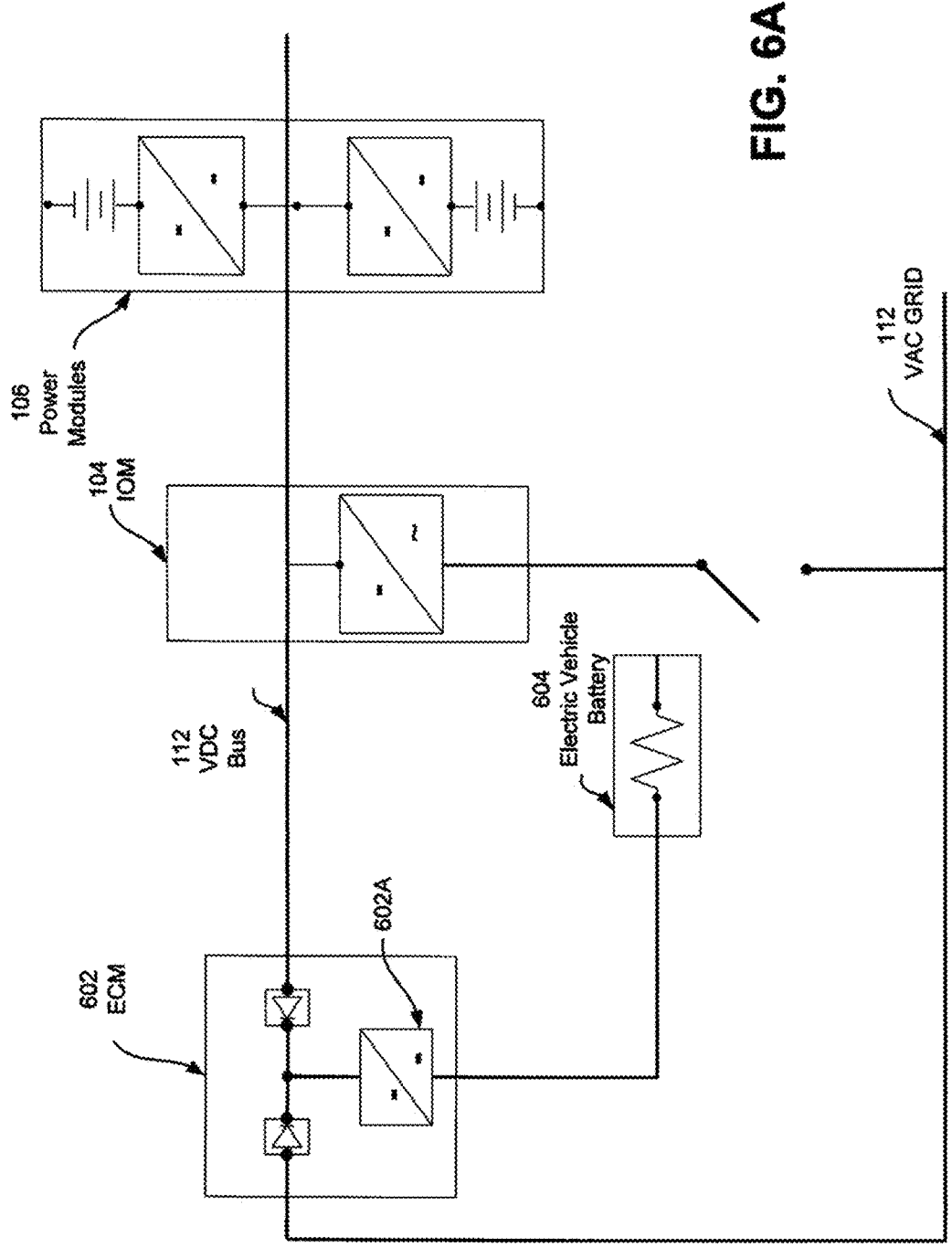

Referring to FIG. 6A, an EV charging station comprises one or more power modules 106, an IOM 104 and an ECM 602. ECM contains a DC/DC converter 602A instead of the inverter 102A of UPM 102. In this embodiment, the EV charging station (e.g., ECM 602) has access to grid power. The EV charging station may feed power simultaneously to the grid and the EV battery. A quick (e.g., 10-20 minute) charge may be provided from ECM 602 to the EV battery 604 using power from the FCM 106. Whenever an EV battery 604 is connected to the charging station (e.g., ECM 602) for a charge, the FCM 106 power is automatically diverted from feeding the grid into the charging station. The diversion of power from the grid to the EV battery 604 may be accomplished by the control logic as illustrated in FIG. 1A and as discussed previously. The grid power may serve as a backup power for the charging station when the power modules 106 are unavailable.

Figure 6B:
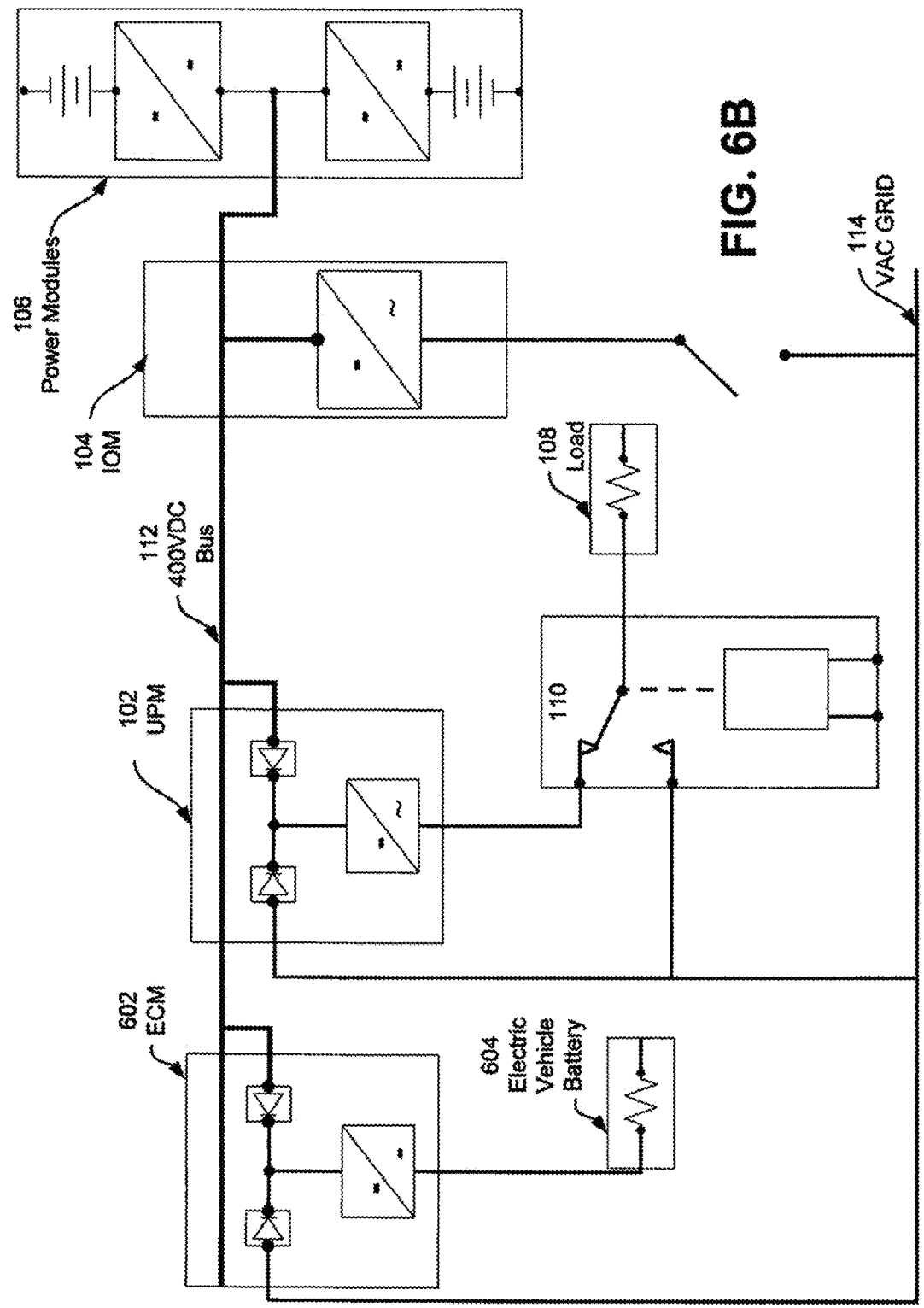

Referring to FIG. 6B, an EV charging station comprises one or more power modules 106, an IOM 104, a UPM 102, control logic unit 110 and an ECM 602. In this embodiment, the EV charging station 602 may also be used to supply a customer load 108 while feeding grid power and charging an EV battery 604. In this configuration, the EV charging station feeds the grid and also provides uninterrupted power to the customer load 108 (such as an office building). The IOM 104 feeds power to the grid, while the UPM 102 supplies power to the customer load 108. The ECM 602 acts as the EV charging station and draws power from the 400V DC bus 112. Thus, the UPM 102 and ECM 602 are connected in parallel to the DC bus 112. While the customer load 108 is supplied without interruption, anytime a vehicle drives in to get charged by the ECM 602, a portion of the power being fed to the grid is diverted to the ECM 602 for the time it takes to charge the EV battery 604. Again, this configuration overcomes the challenge of drawing high peak power from the grid, which is a major issue today especially during day time, when the grid is already supplying full capacity.

A typical application of this configuration would be to supply power to an office building. The load 108 from the building (including data centers, lighting etc) can be supplied clean uninterrupted power from the UPM 102, while power is being fed to the grid. Charging stations can be installed at the car park of this building for the employees and visitors of the company. EV batteries 604 can be charged, and then parked at the car park. Options for both quick charging (1 C) and trickle charging (0.1 C) can be provided at the charging stations, based on the time constraints of the car owner.

Figure 6C:
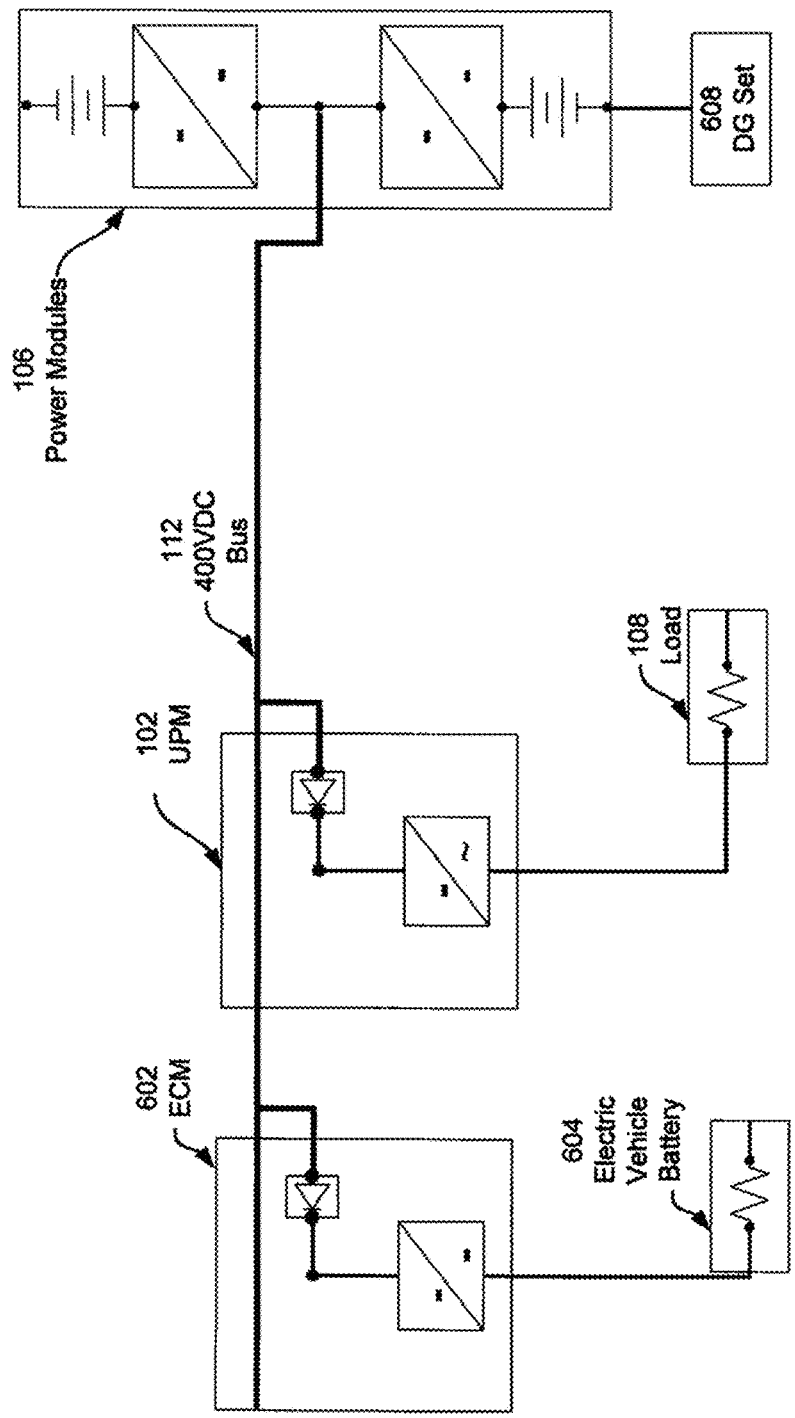

Referring to FIG. 6C an EV charging station comprises one or more power modules 106, a UPM 102, an ECM 602 and a DG set 608. This configuration is suitable for use in remote areas where grid power is not available. In this configuration, the UPM 102 draws power from the DC bus connected to the power modules 106, and feeds the customer load 108. This customer load 108 also acts like a base load to the power modules 106, which allows the system to operate at a certain minimum efficiency (in the configurations illustrated in FIGS. 6A and 6B above, the grid provides the minimum base load for efficient performance). In an embodiment, the power modules 106 and the UPM 102 are rated such that the maximum customer load is always supplied while the ECM 602 is operational. The DG set 608 is used to start up the power modules 106.

Figure 6D:
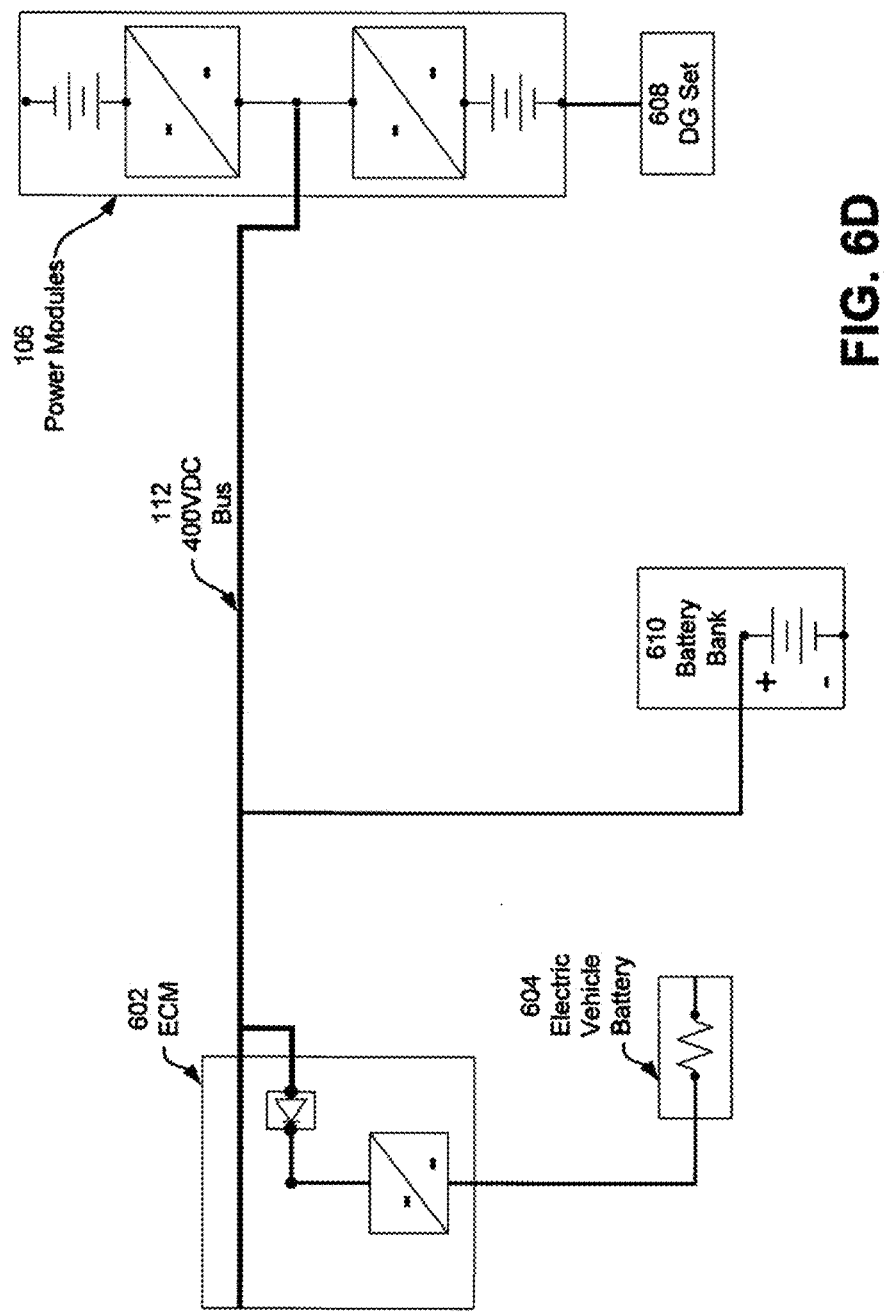

Referring to FIG. 6D, an EV charging station comprises one or more power modules 106 and an ECM 602. This configuration of EV charging stations is suitable for use where there is no grid power and no customer load is to be supplied. The EV charging station is needed only to act as a power source for charging the EV battery 604. In this configuration, a battery bank 610 acts as the base load to the EV charging station. This battery bank 610 may be charged using normal charging (0.1 C). An operator of an EV in need of charging the EV battery 604 may obtain a charge from the ECM 602. Alternatively, the operator may exchange a discharged EV battery 604 for one of the batteries in the battery bank 610. The DG 608 set is used to start up the power modules 106.

In an embodiment, the EV charging station is configured to take advantage of time-of-day pricing and to utilize the storage capacity of the EV batteries. For example, the cost of weekday electricity from 11 AM to 9 PM may be several times (e.g., 5 times) higher than the cost of electricity from 9 PM to 11 AM. In this embodiment, DC power is returned from the EV batteries to the fuel cell system to provide power during peak pricing periods and/or to support shortfalls in the power output from the power modules 106 due to an internal power module 106 fault.

Referring to FIG. 6E, the fuel cell system comprises one or more power modules 106, an IOM 104, a UPM 102, a first control logic unit 110 described above, a switching module 702 containing a switch 702A and second control logic unit 702B, and an ECM 602. If desired, the separate logic units 110 and 702B may be physically combined into a single unit which performs the functions of the unit 110 described above and functions of unit 702B described below. In this embodiment, the power modules 106, IOM 104 and UPM 102 may be used to supply power to a customer load 108 (e.g., a building, such as an office building) while also being able to provide power to the grid, while the ECM 602 may be used for charging an EV battery 604 by drawing power from the 400V DC bus 112. Control logic unit 110 performs the functions as previously described. Control logic unit 702B performs the functions described below. Thus, the UPM 102 and ECM 602 are connected in parallel to the DC bus 112.

In an embodiment, the UPM 102 (e.g., the inverter 102A of UMP 102) is rated higher than would required to provide power to load 108 from the power modules 106 alone. The additional power handling capabilities are used to utilize additional DC power from EV batteries that are connected to the EV charging station (i.e., to ECM 602). The control logic unit 702B switches the switch 702A to connect the EV batteries 604 to the ECM 602 receive power from ECM 602, or to DC bus 112 to provide power to the DC bus 112.

By way of illustration and not by way of limitation, the fuel cell system contains power module(s) 106 which are capable of delivering a first value of maximum power (e.g., 200 kW). The UMP 102 is rated to convert DC to AC to provide a second value of maximum power (e.g., 400 kW AC) which is greater than the first value. In other words, the inverter 102A is designed to convert more DC to AC power than the power module(s) are capable of providing. The UMP 102 uses the additional conversion capacity to convert DC power (e.g., up to 200 kW DC) from the EV batteries 604 to AC power to provide to the load 108 or to the grid 114.

Thus, DC power from an electric vehicle battery 604 is received at an electric vehicle charging module (ECM) 602 during a period of higher electricity price from the grid, the received power is provided to the at least one inverter 102A which converts the received DC power to AC power, and provides the AC power to a load (e.g., 108 or grid load 114).

In one embodiment, DC power is provided from the at least one fuel cell power module 106 to the ECM 602, and then provided from the ECM to the electric vehicle battery 604 when the cost of electricity is lower, prior to the step of receiving DC power.

The combination EV charging station and fuel cell system may be located at a business having employees that drive electric cars. Using the time of day pricing set forth above, these employees would generally park their EVs at the business recharging docks and connect the EV batteries 604 to the ECM 602 for 8 to 10 hours during the work day. Typically, all the EV batteries 604 are fully charged (with the switch 702A connecting batteries 604 to ECM 602) before the price of power from the grid increases (e.g., by 11 AM) using the power provided from the ECM 602. Then, after the price of the grid power increases (e.g., after 11 AM), logic 702B switches the switch 702A position to connect the EV batteries 604 to the DC bus 112. The batteries 604 are then used to provide a portion (e.g., 10-75%, for example 50%) of their stored charge to the DC bus 112. For example, the EV batteries may receive more charge each day (or each week etc.) than they provide back to the DC bus. If desired, the owners of the EVs may not be charged for the net charge they received or be charged a reduced rate compared to the rate for charging EV batteries from the grid. The charging station could then deliver up to 400 kW AC to load 108 in a peak-shaving load-following manner. All parties would financially benefit because of the increased price of the mid-day electricity.

In another embodiment, the electric vehicle battery is charged at a location other than the ECM 602 during a lower cost electricity price period prior to the step of receiving DC power from the ECM 602 during the higher cost of electricity price period. For example, EVs are charged at a remote location (e.g., from the grid at home overnight) using lower cost, night time electricity. These EVs may then be connected to the ECM 602 in the morning. After the price of electricity increases mid-day (e.g., after 11 AM) the EV batteries 604 deliver a predetermined portion of their stored charge to the DC bus 112. Thus bus can then deliver up to 400 kW AC to load 108 in a peak-shaving load-following manner. The EV owners may be reimbursed for the cost of provided power (i.e., for the power they stored at their home and delivered to the bus 112). Here again all parties financially benefit because of the higher price of mid-day electricity.

Of course, the times used in the foregoing examples are for illustrative purposes only. The charging station may be configured to utilize power from the EV batteries to address the time-of-day pricing for the region in which the charging station is located.

The above described methods and systems can be readily used with multiple generators in parallel with a large load, while allowing tight control of frequency and voltage.

Figure 7:
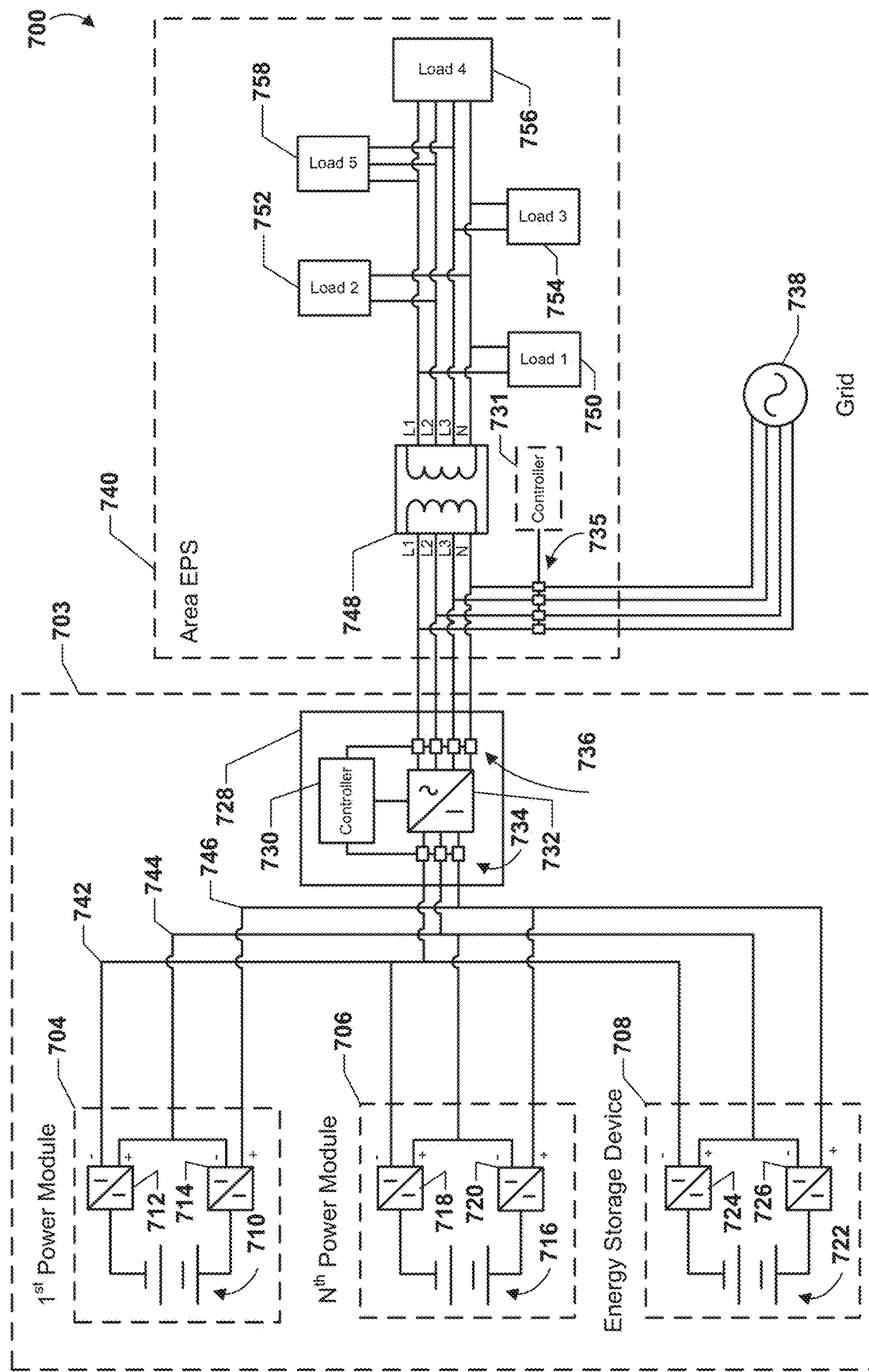
FIG. 7 is a block diagram of a power supply system according to an embodiment of the present disclosure.

FIG. 7 is a block diagram of an energy power supply system according to an embodiment of the present disclosure.

Referring to FIG. 7, an electric power system 700 includes an alternative DC power source system 703, a utility grid node 738, and an area EPS 740. For clarity and ease of description, additional elements are omitted from FIG. 7. However, the electric power system 700, the alternative DC power source system 703, the utility grid node 738 and/or the area EPS 740 may further include various power generation, distribution and/or conditioning elements not illustrated in FIG. 7.

The alternative DC power source system 703 can include one or more power modules such as between two and thirty six power modules, e.g., between six and twelve power modules. For example, as illustrated in FIG. 7, the alternative DC power source system 703 can include a first power module 704, an $N^{th}$ power module (where N=any integer greater than one) 706, and a power storage device 708. However, the alternative DC power source system 703 can include any number of power modules and/or power storage devices.

The alternative DC power source system 703 can include one or more different types of power modules. For example, the alternative DC power source system 703 can include one or more of a fuel cell system, a solar array, a wind turbine including an AC to DC rectifier, a thermo-electric device, a battery, a bank of supercapacitors, a fly wheel, another DC power source, or a combination thereof.

Each power module and power storage device of the alternative DC power source system 703 can include a power generator and various power conditioning elements. For example, as illustrated in FIG. 7, the first power module 704 can include a power generator 710 and power conditioning elements 712, 714, the Nth power module 706 can include a power generator 716 and power conditioning elements 718, 720, and energy storage device 708 can include a power source 722 and power conditioning elements 724, 726.

While FIG. 7 illustrates that the first power module 704, the Nth power module 706, and the energy storage device 708 include one power generator 710, 716, 722, the first power module 704, the Nth power module 706, and/or the energy storage device 708 can include any number of power generators and/or sources. For example, a power generator or source 710, 712, 722 can include an array of power generators and/or sources. In an exemplary embodiment, a power generator can include an array of two to six power generators, such as four power generators.

When one or more of the power modules of alternative DC power source system 703 are fuel cells, each power module 704, 706 can include one or more fuel cell power generators. Each fuel cell power generator may include one or more stacks or columns of fuel cells which can be electrically connected into fuel cell segments. The fuel cells may be a solid oxide fuel cell having a ceramic oxide electrolyte separated by conductive interconnect plates. However, other types of fuel cells, such as polymer electrolyte membrane (PEM), molten carbonate, phosphoric acid, etc. may also be used. Each fuel cell stack can include fuel cells electrically connected in series and separated by electrically conductive interconnects, such as gas separator plates which function as interconnects. A fuel cell stack can include conductive end plates on either end of the stack.

The output of each power generator or source 710, 716, 722 can be electrically coupled to one or more power conditioning elements such as power conditioning elements 712, 714, 718, 720, 724, 726. In an exemplary embodiment, the power conditioning elements 712, 714, 718, 720, 724, 726 can be configured to convert the voltage level of the DC power generated by the power generator 710, 716, 722 from a first voltage level to a second voltage level. For example, the power conditioning elements 712, 714, 718, 720, 724, 726 can be DC/DC converters configured to increase (e.g., boost) or decrease (e.g., buck) the voltage of the DC power generated by the power generator 710, 716, 722.

While the power conditioning elements 712, 714, 718, 720, 724, 726 are illustrated as being disposed within the power modules 704, 706 and the energy storage device 708 in FIG. 7, one or more of the power conditioning elements 712, 714, 718, 720, 724, 726 may be standalone elements, incorporated within another element (e.g., IOM), or omitted.

The alternative DC power source system 703 can further include an inverter 728. The inverter 728 can be configured to perform power quality monitoring and/or dynamic phase control in order to maintain power quality and/or stability within the area EPS 740. The inverter 728 can include a controller or processor 730 and a power conditioning device 732. In addition, the inverter 728 can further include one or more communication interfaces (not illustrated) such as a wireless and/or wired communication interface configured to communicate with one or more computing devices. In exemplary embodiment, the inverter 728 can be configured to monitor various power characteristics, perform automatic load balancing among the three phases, compensate for individual phase harmonics, or individually monitor, compensate, or control the power factor for each of the three phases. In some embodiments, the inverter 728 can further control and/or dynamically provide power generated by one or more of the first power module 704, the $N^{th}$ power module 706, or the energy storage device 708 to the area EPS 740 such that the power is individually requested from the first power module 704, the $N^{th}$ power module 706, or the energy storage device 708.

Each of the power modules 704, 706 and/or the energy storage device 708 can be electrically coupled to the inverter 728 via buses 742, 744, 746 such that the outputs of the power modules 704, 706 and/or the energy storage device 708 are combined to provide three separate inputs to the inverter 728. The buses 742, 744, 746 can be configured such that no matter how many power modules and/or energy storage devices are included in the alternative DC power source system 703, the outputs of all of the power modules and/or energy storage devices included in the alternative DC power source system 703 are combined to create three separate inputs to the inverter 728.

In an exemplary embodiment, the power conditioning elements 712, 714, 718, 720, 724, 726 of the power modules 704, 706 and the energy storage device 708 can each include a positive output and a negative output. The positive output of power conditioning elements 714, 720, 726 can be combined via bus 746 to create a first input (e.g., a positive input) to the inverter 728. The negative output of power conditioning elements 712, 718, 724 can be combined via bus 742 to create a second input (e.g., a negative input) to the inverter 728. The positive output of power conditioning elements 712, 718, 724 and the negative output of power conditioning elements 714, 720, 726 can be combined via bus 744 to create a third input (e.g., a neutral input) to the inverter 728.

The power conditioning device 732 can be configured to modify or condition one or more properties of the power received at the first input, the second input, and/or the third input of the inverter 728. While FIG. 7 illustrates the power conditioning device 732 as a single element, the power conditioning device 732 can include any number of power conditioning elements and when the power conditioning device 732 includes a plurality of power conditioning elements, the plurality of power conditioning elements can the same or different power conditioning elements. In an embodiment, the power conditioning device 732 can include components for converting the DC power generated or provided by the power modules 704, 706 and/or the energy storage device 708 to different AC voltages and/or frequencies, electric connectors including connectors to an AC microgrid and/or connectors to the AC grid associated with the utility grid node 738, circuits for managing electrical transients, etc.

The controller 730 can be a processor, system controller, computing device, dedicated controller device or circuit, or the like configured to monitor, manage, and/or control one or more various operations of the inverter 728 and/or the alternative DC power source system 703. For example, the controller 730 can monitor, manage, and/or control one or more of the first input, the second input, or the third input provided to the power conditioning device 732 from one or more of the power modules 704, 706, or the energy storage device 708. Additionally, or alternatively, the controller 730 can monitor, manage, and/or control the power output from the inverter 728 to the area EPS 740.

For example, the controller 730 can be configured to monitor the quality or stability of the power provided to the area EPS 740. In some embodiments, the controller 730 can determine whether a phase imbalance, poor power factor, and/or harmonics are detected on lines L1, L2, L3, N between the inverter 728 and the area EPS 740. In some embodiments, one or more sensors 736 can be implemented between the output of the power conditioning device 732 and the area EPS 740 to detect, monitor, and/or measure output power, voltage, and/or current for each line L1, L2, L3, N as a function of time.

In addition, the controller 730 can detect, monitor, measure, and/or control the process of distributing power generated or provided by the power modules 704, 706, and/or energy storage device 708. For example, the controller 730 can determine availability or quality of the power generated by each of the power modules 704, 706, and/or provided by energy storage device 708 using one or more sensors 734. Moreover, the controller 730 can individually pull power from one or more of the power modules 704, 706, and/or energy storage device 708 as well as issue separate commands to each of the power modules 704, 706, and/or energy storage device 708 to dictate how much power should come from each of the power modules 704, 706, and/or energy storage device 708.

In some embodiments, one or more sensors 735 can be located on the first phase wire, a second phase wire, a third phase wire, and/or a neutral wire from the utility grid node 738 to monitor power provided from the utility grid node 738 to the area EPS 740. The one or more sensors 735 can be in wired or wireless communication with the controller 730. The controller 730 can monitor, manage, and/or control one or more variables associated with a power signal provided to the area EPS 740 based on the detected power provided from the utility grid node 738.

In other embodiments, the area EPS 740 can optionally include an EPS controller 731 (shown in dashed lines) in wired or wireless communication with the one or more sensors 735. The EPS controller 731 can monitor, manage, and/or control the power provided from the utility grid node 738 to the area EPS 740. For example, the controller 731 can monitor, manage, and/or control one or more variables associated with a power signal provided to the area EPS 740 via a first phase wire, a second phase wire, a third phase wire, and/or a neutral wire from the utility grid node 738.

While not illustrated, the EPS controller 731 can include or be coupled with a communication interface to allow the EPS controller 731 to send and/or receive information from various devices, such as the controller 730, via the communication interface. The communication interface can be a wired and/or wireless communication interface. In an embodiment, the EPS controller 731 can monitor the one or more sensors 735 in the area EPS 740 and communicate information associated with the measurements detected using the one or more sensors 735 to the controller 730 using an Ethernet communication protocol. However, any communication interface and protocol may be implemented. The controller 730 can use the information received from the EPS controller 731 in various ways including in any power quality or stability calculation and/or compensation determination. In this case, the controller 730 can indirectly monitor the output of the one or more sensors 735 through the EPS controller 731 and control the power provided to the area EPS 740 based on the data received from the sensors 735.

For clarity and ease of description, sensors 734, 735, 736 are illustrated in FIG. 7 as separate devices. However, the controller 730 can employ any method or process of detecting, measuring, monitoring, and/controlling input power received at the inverter 728 from the power modules 704, 706, and/or energy storage device 708 as well as output power provided to the area EPS 740 from the inverter 728 and the power provided to the area EPS 740 from the utility grid node 738 by omitting one or more of each of the sensors 734, 735, 736.

In addition, in some microgrid applications, the area EPS 740 may be coupled to one or more alternative DC power source systems such as alternative DC power source system 703 such that the utility grid node 738 is not coupled to the area EPS 740. In that case, the controller 731 and the one or more sensors 735 are omitted from the area EPS 740.

The power generated and/or provided by the alternative DC power source system 703 output from the inverter 728 can be three-phase power such that separate lines (e.g., conductors or wires) can each carry an alternating current having a different phase difference, but the same or substantially the same frequency and voltage amplitude relative to a common reference. As illustrated in FIG. 7, the three-phase AC power can be distributed using a four-wire circuit such that a first phase is distributed on a first line L1, a second phase is distributed on a second line L2, a third phase is distributed on a third line L3, and a neutral line N common to all three phases that carries any unequal phase currents resulting from any phase imbalances within the network. While FIG. 7 illustrates a 3-phase, 4-wire (i.e., 4-line) network, the distribution network between the alternative DC power source system 703 and the area EPS 740 may be any phase and/or circuit configuration including a two-wire, single-phase circuit, a 3-phase, 3-wire circuit, etc.

Referring to FIG. 7, in some embodiments, the electric power system 700 can further include a transformer 748. The transformer 748 can be configured to transform the power received at an input of the transformer 748 from a first voltage level to a second voltage level. The transformer 748 can be configured to step up or step down the voltage of the power provided by the alternative DC power source system 703 and/or the utility grid node 738 to the area EPS 740. In an alternative embodiment, as illustrated in FIG. 8, a transformer may be omitted from the electric power system 700 such that the power provided by the alternative DC power source system 703 and/or the utility grid node 738 may be directly coupled to the area EPS 740.

The area EPS 740 can receive power from the alternative DC power source system 703 and/or the utility grid node 738 via the 4-line feed including L1, L2, L3, N. Specifically, the utility grid node 738 can be connected with the output of the inverter 728 at a junction such that power distributed by the alternative DC power source system 703, power distributed by the utility grid node 738, or a combination thereof may be used to power the one or more of the loads included in the area EPS 740.

The area EPS 740 can include any number and any type of load. For example, the area EPS 740 can include one or more loads such as a first load ("Load 1") 750, a second load ("Load 2") 752, a third load ("Load 3") 754, a forth load ("Load 4") 756, and a fifth load ("Load 5") 758. As illustrated in FIG. 7, Load 1 750, Load 2 752, and Load 3 754 can be single phase loads and Load 4 756 and Load 5 758 can be three-phase loads. However, the area EPS 740 can include any number of different types of loads coupled to the three phases of power provided via the 4-line feed including L1, L2, L3, N For clarity and ease of illustration, loads 750, 752, 754, 756, 758 are illustrated as a single component in FIGS. 7 and 8. However, loads 750, 752, 754, 756, 758 may include a one or more distinct electric loads. For example, as illustrated in FIG. 9, in some embodiments Loads 1A, 1B, 1C (750A-C) can be single phase electric loads electrically coupled to a first phase of the power via lines L1 and N, Loads 2A, 2B, 2C (752A-C) can be single phase electric loads electrically coupled to a second phase of the power via lines L2 and N, Loads 3A, 3B, 3C (754A-C) can be single phase electric loads electrically coupled to a third phase of the power via lines L3 and N, and Loads 5A, 5B, 5C (758A-C) can be three-phase electric loads electrically coupled to the first, second, and third phases of the power via lines L1, L2, and L3, while Load 4 756 is coupled to all four lines L1, L2, L3, and N.

Figure 8:
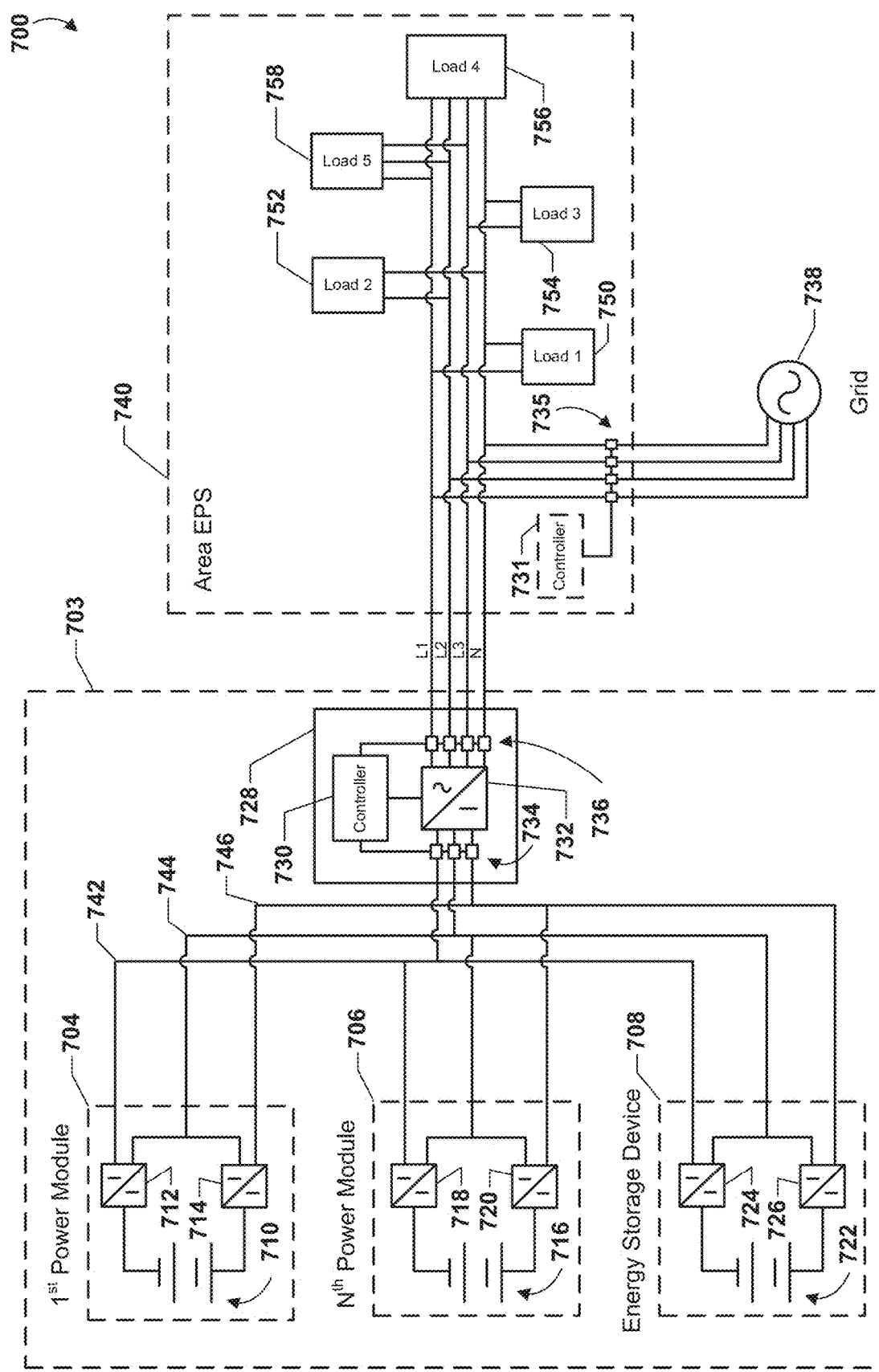
FIG. 8 is a block diagram of a power supply system according to another embodiment of the present disclosure.
Figure 9:
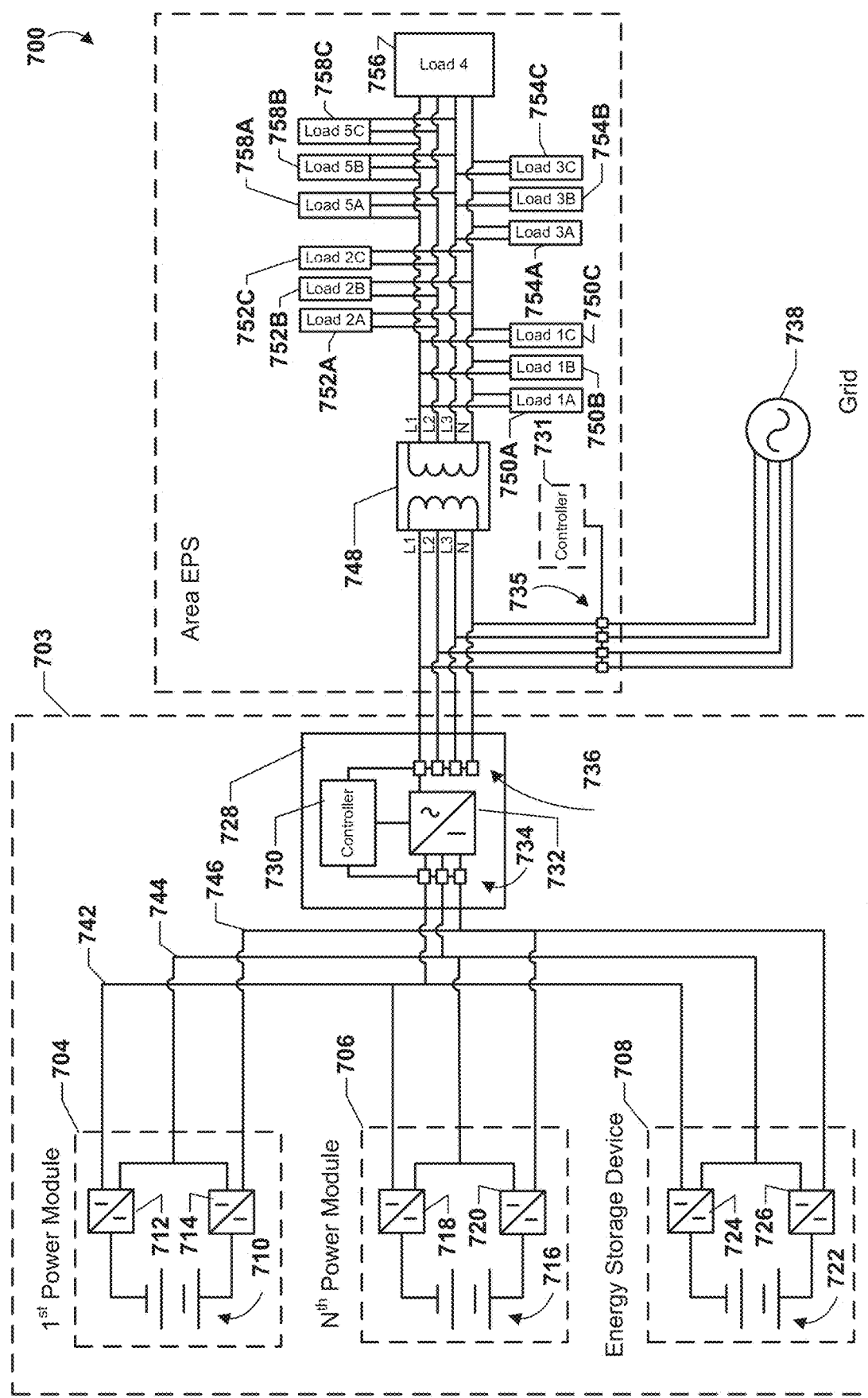
FIG. 9 is a block diagram of a power supply system according to another embodiment of the present disclosure.

While FIGS. 7-9 may illustrate that the loads are electrically coupled to the three phases of power via feeds L1, L2, L3, N in a substantially balanced way, any number and/or type of electric loads may be distributed throughout the area EPS 740 in any arrangement and/or configuration including an arrangement or configuration that may typically create a load imbalance in a convention system. For example, conventional methods and processes may require that the electric loads within the area EPS 740 be physically distributed amongst the different phases of power such that the amount of power drawn from each of the three phases of power throughout the area EPS 740 is substantially equal regardless of whether the electric loads are actively consuming power or not.

In contrast, in an embodiment, the inverter 728 can be configured to dynamically modify the power for each phase of the power based on an amount of power being drawn by the active electric loads electrically coupled to each phase. In some embodiments, the inverter 728 can be configured to determine if one of the three phases of power has a heavier load than the other phases. If the inverter 728 determines that one or more of the three phases of power is a heavier loaded phase/line (e.g., a phase where the arrangement and/or configuration of the active loads results in a greater amount of power being drawn) and at least one of the three phases of power is a lighter loaded phase/line (e.g., a phase where the arrangement and/or configuration of the active loads results in a lower amount of power being drawn from the phase than the heavier loaded phase), the inverter 728 can be configured to rebalance the power such that the heavier loaded phase/line receives more power and the lighter loaded phase/line receives less power. As used herein, a "heavier load" means that a phase/AC line receivers a higher load power demand than another phase/AC line.

As used herein, a "lighter load" means that a phase/AC line receivers a lower load power demand than another phase/AC line.

For example, referring to FIG. 9, if Loads 1A-1C, (750A-C), Load 2A (752A), Load 3A (754A), Load 4 (756) and Loads 5A-B (758A-B) are "on" and actively consuming power from the respective phases while Loads 2B-C (752B-C), Loads 3B-C (754B-C), and Load 5C (758C) are "off" and not actively consuming power from the respective phases, this may create a load imbalance. Because the phase associated with the line L1 is providing power to six loads (e.g., Loads 1A-C, Load 4, and Loads 5A-B), the phase associated with the line L2 is providing power to four loads (e.g., Loads 2A, Load 4, and Loads 5A-B), and the phase associated with the line L3 is providing power to four loads (e.g., Load 3A, Load 4, and Loads 5A-B), the inverter 728 can determine that the phase associated with the line L1 is powering a heavier load than the lines L2 and L3.

In some embodiments, the rebalancing of power between a heavier loaded phase and a lighter loaded phase can result in the electric utility detecting that the power within the area EPS 740 is balanced (i.e., when the electric utility is performing the process of planning for anticipated balance loading).

Figure 10:
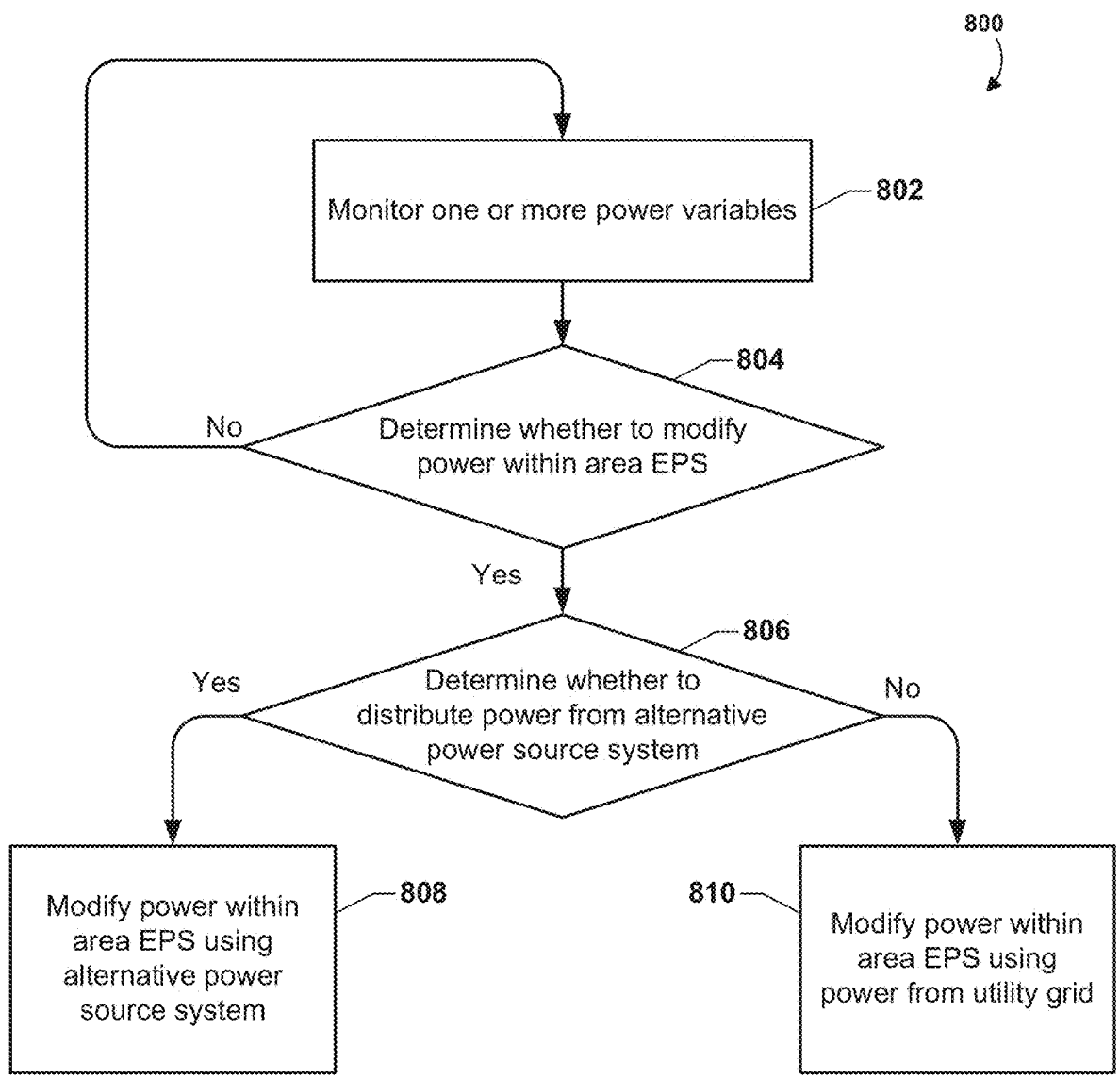
FIG. 10 is a flow chart illustrating a method for controlling an inverter for a hybrid electrical power system according to an embodiment of the present disclosure.

FIG. 10 illustrates an embodiment method 800 for controlling an inverter 728 for a hybrid fuel cell system. With reference to FIGS. 1-10, the method 800 can be implemented by one or more controllers or processors of an inverter for a hybrid electric power system. For example, the method 800 can be implemented by controller 730, one or more controllers or processors of inverters 102A, 104A, 412, 512, and/or 728, and/or one or more system controllers or controller devices in communication with inverters 102A, 104A, 412, 512, and/or 728 in a hybrid electric power system such as electric power system 700.

In block 802, the processor can monitor one or more power variables within the hybrid electric power system. For example, the processor can monitor the power generated by the first power module 704, the Nth power module 706, and/or the energy storage device 708 using sensors 734 and/or the power distributed and/or consumed within the area EPS using one or more sensors 736. The one or more power variables can include variables associated with power imbalance (e.g., difference in input and/or output power to and from the inverter 728), power factor, harmonics, or any other variable associated with the quality or stability of power. In some embodiments, the one or more power variables can include one pu values, a current associated with each phase, a voltage associated with each phase, a current detected on the neutral line, a load demand value for each phase, etc.

In block 804, the processor can determine whether to modify power within the area EPS 740 in various ways. In some embodiments, the processor can determine whether a power command has been received by the inverter 728. For example, the power command can be generated by the electric utility, internal system controller 730, and/or external system controller such that the inverter 728 receives the power command via a wired or wireless communication interface. The power command may include pu values of positive, negative, and zero sequence commands.

Additionally or alternatively, the processor may monitor various power variables via sensors 734 or 736 and in response to one or more of the power variables no longer meeting a threshold value, the processor may determine to modify power within the area EPS 740. For example, the processor can monitor the individual phase currents and/or voltages within the area EPS 740 to determine whether a phase imbalance is detected, monitor the neutral feed line N for harmonic currents, or variables associated with of power generated by the first power module 704, the Nth power module 706, and/or the energy storage device 708.

In response to determining to modify the power within the area EPS 740 (i.e., determination block 804="Yes"), the processor can optionally determine whether to distribute or continue to distribute power from an alternative DC power source system 703 to the area EPS 740 in block 806. In some embodiments, this determination may be based on an amount and/or availability of power generated at one or more of the power modules 704, 706 and/or stored at the energy storage device 708. For example, if one or more of the power modules 704, 706 is a solar array and/or wind turbine, the power generated by such modules may be dependent on environmental conditions and thus an adequate amount of power may not be reliably available from such power modules. If one or more of the power modules 704, 706 is a fuel cell system, the availability of power generated by such modules may be dependent on an amount of fuel supplied to the fuel cell system. Alternatively or additionally, if the power is supplied from an energy storage device 708, the amount and/or availability of the power provided by the energy storage device can be based on the operation of the power generation device used to generate the power stored at the energy storage device.

In some embodiments, the processor can further determine whether to supply power such that all of the power distributed to the area EPS 740 is generated by the first power module 704, 706, and/or energy storage device 708 or the processor can determine an amount of power that can be used to supplement or augment the power provided by the utility grid node 738.

In response to determining not to modify the power within the area EPS 740 (i.e., determination block 804="No"), the processor can return to monitoring one or more power variables in block 802.

In response to determining to distribute (or to continue to distribute) at least a portion of the power to the area EPS 740 from the alternative DC power source system 703 (i.e., determination block 806="Yes"), the processor can modify the power within the area EPS 740 using at least a portion of the power from the alternative DC power source system 703 in block 808. For example, the processor can selectively provide power from the power modules 704, 706 and/or the energy storage device 708 such that the power provided by each of the power modules 704, 706 and/or the energy storage device 708 may be the same or different.

In an exemplary embodiment, when the decision to modify the power for the area EPS 740 is based on power variables associated with phase imbalance, the processor can individually determine how much power to provide from each of the power modules 704, 706 and/or the energy storage device 708. For example, in response to receiving pu values associated with positive, negative, and zero sequence commands from the electric utility or external controller, the processor may determine how much power is necessary to supplement or meet each of the positive, negative, and zero sequence commands. In response to monitoring the individual phase currents or voltages, the processor may individually adjust the input currents or voltages, respectively, provided via lines L1, L2, and L3 to create output currents or voltages to overcome the phase imbalance. In response to detecting a current on the neutral line N, the processor can individually adjust the currents provided via lines L1, L2, and L3 to create a neutral zero current output such as in the case of purely resistive loads. Similar pu value, current, and/or voltage modifications can be made based on power variables associated with other power quality and stability factors such as power factor, harmonics, etc.

In some embodiments, the inverter 728 can monitor the individual phase currents or voltages to determine heavier and lighter loaded phases using one or more of the sensors 736. After the inverter 728 has identified the heavier and lighter loaded phases, the inverter 728 can modify the power and provide more power to the heavier loaded phase than the lighter loaded phase. For example, the inverter 728 can pull different amounts of power from the alternative DC power source system 703 on each line coming into the input of the inverter 728.

In an exemplary embodiment, the processor may generate separate commands to dictate how much power should be supplied by each of the individual DC power sources such as the power modules 704, 706 and/or the energy storage device 708. For example, in response to determining how much total power is needed from the alternative DC power source system 703 and how much power is needed from each of the power modules 704, 706 and/or the energy storage device 708, the process may generate a separate command to each of power modules 704, 706 and/or the energy storage device 708 indicating an amount of output power requested to be provided to the area EPS 740.

In response to determining not to distribute power to the area EPS 740 from the alternative DC power source system 703 (i.e., determination block 806="No"), the processor can modify the power within the area EPS 740 using power from the utility grid node 738 in block 810. For example, the processor can determine which of the three phases is an underutilized phase and which of the three phases is an overloaded phase. In addition, the processor can determine the extent to which the identified phases are underutilized or overloaded. Accordingly, the processor can redirect energy from the underutilized phase and deliver it to the overloaded phase. If more than one phase is underutilized, the energy from the plurality of underutilized phases can both be redirected to the overloaded phase. In an exemplary embodiment, the processor can establish a balance between the different phases by producing more current on the overloaded phase and less current on the underutilized phase.

Thus, in summary, a method of controlling an inverter 728 having a three phase output and a plurality of single phase loads 750, 752, 754 connected to respective one of the three phases of the three phase output includes determining if a first phase of the three phase output has a heavier load than a second phase of the three phase output, and providing a higher output power from the inverter to the first phase than to the second phase if it is determined that the first phase has a heavier load than the second phase. The inverter 728 has a three phase input connected to an output of a direct current (DC) distributed power source 703.

In an embodiment, the inverter 728 is controlled to draw more power from the DC distributed power source 703 on a first phase (e.g., the phase on the first DC line L1) of the three phase input connected to the DC distributed power source which corresponds to the first phase (e.g., the phase on the first AC line L1) of the three phase output of the inverter than to a second phase (e.g. to the phase on the second DC line L1) of the three phase input which is connected to the DC distributed power source which corresponds to the second phase (e.g., the phase on the second AC line L2) of the three phase output.

The DC distributed power source 703 includes one or more of a fuel cell system, a solar array, thermoelectric device or wind turbine with alternating current (AC) to DC rectifier. In one embodiment, the DC distributed power source comprises a fuel cell system 704, 706 which includes a power storage device 708.

In one embodiment, the plurality of single phase loads 750, 752, 754 are part of an AC microgrid which is part of the area EPS 740, and the microgrid further includes a three phase load 758 connected to the three phase output of the inverter 728.

In one embodiment, the method further comprises detecting at least one first power characteristic at the three phase input of the inverter 728 using at least one first sensor 734 and detecting at least one second power characteristic at the three phase output of the inverter 728 using at least one second sensor 736. The higher output power from the inverter 728 to the first phase (e.g., to AC line L1) is provided based on the at least one first power characteristic or the at least one second power characteristic. The first power characteristic comprises power available from the DC distributed power source, and the second power characteristic comprises load power demands on each phase of the three phase output.

In another embodiment, the method includes determining whether to modify the three phase output based on information associated with one or more power quality characteristics, wherein the higher output power provided from the inverter to the first phase is based on the information associated with one or more power quality characteristics, and wherein the one or more power quality characteristics include one or more of a phase imbalance, power factor, or harmonics.

In another embodiment, the step of providing the higher output power from the inverter 728 to the first phase (e.g., AC line L1) than to the second phase (e.g., AC line L2) comprises redirecting electric grid 738 AC power from the second phase to the first phase by the inverter.

In one embodiment shown in FIGS. 7-9, an electric power system contains direct current (DC) distributed power source 703, a DC to alternating current (AC) inverter 728 and an AC microgrid that is part of an area EPS 740 comprising a plurality of single phase loads 750, 752, 754. First, second and third DC lines (L1, L2, L3 shown on the left of inverter 728) electrically connect an output the DC distributed power source 703 to an input of the inverter 728. First, second and third AC lines (L1, L2, L3 shown in right of inverter 728) connect an output of the inverter to an input of the microgrid. Each of the plurality of single phase loads 750, 752 and 754 is connected to a respective one of the first, second and third AC lines (L1, L2 and L3). The system also includes a processor 730 configured with processor-executable instructions to perform operations comprising determining whether to provide more output power from the inverter to a first AC line L1 than to a second AC line L2 or third AC line L3 based on one or more monitored power quality variables detected on the first, second and third AC lines, and providing a higher output power to the first AC line L1 than to the second AC line L2 or third AC line L3 in response to the step of determining.

The power quality variables are selected from one or more of phase imbalance, power factor, or harmonics. In one embodiment, the power quality variables comprise phase imbalance in which the first AC line L1 has a heavier load than the second and third AC lines L2, L3.

In one embodiment, the processor 730 is further configured with processor-executable instructions to perform operations comprising controlling the inverter 728 to draw more power from the DC distributed power source 703 on the first DC line L1 which corresponds to the first AC L1 line at the output of the inverter 728 than to the second DC line L2 which corresponds to the second AC line L2 at the output of the inverter 728.

In one embodiment, microgrid further includes a three phase load 758 connected to the first, second and third AC lines (L1, L2, L3), and the first, second and third AC lines are connected to a node of an electric grid 738.

In one embodiment, the system also includes at least one first sensor 734 located at the input of the inverter and at least one second sensor 736 located at the output of the inverter 728. The at least one first sensor is configured to detect available power form the DC distributed power source 703, and the at least one second sensor is configured to separately detect a loads on the first, second and third AC lines (L1, L2, L3).

In one embodiment shown in FIG. 7, a transformer 748 is located on the first, second and third AC lines (L1, L2, L3) between the inverter 728 and the microgrid in the area EPS 740. In one embodiment, a neutral line N connects the output of the inverter 728 to the input of the microgrid in the area EPS 740

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electric hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A method of controlling an inverter having a three phase output and a plurality of single phase loads connected to respective one of the three phases of the three phase output, comprising:
   determining if a first phase of the three phase output has a heavier load than a second phase of the three phase output; and
   providing a higher output power from the inverter to the first phase than to the second phase if it is determined that the first phase has a heavier load than the second phase.

2. The method of claim 1, wherein the inverter has a three phase input connected to an output of a direct current (DC) distributed power source.

3. The method of claim 2, further comprising controlling the inverter to draw more power from the DC distributed power source on a first phase of the three phase input connected to the DC distributed power source which corresponds to the first phase of the three phase output of the inverter than to a second phase of the three phase input which is connected to the DC distributed power source which corresponds to the second phase of the three phase output.

4. The method of claim 2, wherein the DC distributed power source includes one or more of a fuel cell system, a solar array, thermoelectric device or wind turbine with alternating current (AC) to DC rectifier.

5. The method of claim 2, wherein the DC distributed power source comprises a fuel cell system which includes a power storage device.

6. The method of claim 2, wherein:
   the plurality of single phase loads are part of an AC microgrid; and
   the microgrid further includes a three phase load connected to the three phase output of the inverter.

7. The method of claim 6, further comprising:
   detecting at least one first power characteristic at the three phase input of the inverter using at least one first sensor; and
   detecting at least one second power characteristic at the three phase output of the inverter using at least one second sensor;
   wherein the higher output power from the inverter to the first phase is provided based on the at least one first power characteristic or the at least one second power characteristic.

8. The method of claim 2, wherein the first power characteristic comprises power available from the DC distributed power source, and the second power characteristic comprises load power demands on each phase of the three phase output.

9. The method of claim 1, further comprising determining whether to modify the three phase output based on information associated with one or more power quality characteristics,
   wherein the higher output power provided from the inverter to the first phase is based on the information associated with one or more power quality characteristics, and
   wherein the one or more power quality characteristics include one or more of a phase imbalance, power factor, or harmonics.

10. The method of claim 1, wherein providing the higher output power from the inverter to the first phase than to the second phase comprises redirecting electric grid AC power from the second phase to the first phase by the inverter.

11. An electric power system, comprising:
   direct current (DC) distributed power source;
   a DC to alternating current (AC) inverter;
   an AC microgrid comprising a plurality of single phase loads;
   first, second and third DC lines electrically connecting an output the DC distributed power source to an input of the inverter;
   first, second and third AC lines connecting an output of the inverter to an input of the microgrid, wherein each of the plurality of single phase loads is connected to a respective one of the first, second and third AC lines; and
   a processor configured with processor-executable instructions to perform operations comprising:
      determining whether to provide more output power from the inverter to a first AC line than to a second or third AC line based on one or more monitored power quality variables detected on the first, second and third AC lines; and
      providing a higher output power to the first AC line than to the second or third AC line in response to the step of determining.

12. The electric power system of claim 11, wherein the power quality variables are selected from one or more of phase imbalance, power factor, or harmonics.

13. The electric power system of claim 12, wherein the power quality variables comprise phase imbalance in which the first AC line has a heavier load than the second and third AC lines.

14. The electric power system of claim 13, wherein the DC distributed power source includes one or more of a fuel cell system, a solar array, thermoelectric device or wind turbine with alternating current (AC) to DC rectifier.

15. The electric power system of claim 14, wherein the DC distributed power source a fuel cell system which includes a power storage device.

16. The electric power system of claim 13, wherein the processor is further configured with processor-executable instructions to perform operations comprising controlling the inverter to draw more power from the DC distributed power source on the first DC line which corresponds to the first AC line at the output of the inverter than to the second DC line which corresponds to the second AC line at the output of the inverter.

17. The electric power system of claim 11, wherein the microgrid further includes a three phase load connected to the first, second and third AC lines, and the first, second and third AC lines are connected to a node of an electric grid.

18. The electric power system of claim 11, further comprising at least one first sensor located at the input of the inverter and at least one second sensor located at the output of the inverter, wherein the at least one first sensor is configured to detect available power form the DC distributed power source, and the at least one second sensor is configured to separately detect a loads on the first, second and third AC lines.

19. The electric power system of claim 11, further comprising a transformer located on the first, second and third AC lines between the inverter and the microgrid.

20. The electric power system of claim 11, further comprising a neutral line connecting the output of the inverter to the input of the microgrid.

* * * * *